United States Patent
Chikuma et al.

(10) Patent No.: US 6,629,743 B2
(45) Date of Patent: Oct. 7, 2003

(54) INK JET RECORDING METHOD, RECORDING APPARATUS AND DATA PROCESSING METHOD

(75) Inventors: Toshiyuki Chikuma, Kawasaki (JP); Naoji Otsuka, Yokohama (JP); Kiichiro Takahashi, Kawasaki (JP); Hitoshi Nishikori, Inagi (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/908,141

(22) Filed: Jul. 19, 2001

(65) Prior Publication Data

US 2002/0021317 A1 Feb. 21, 2002

(30) Foreign Application Priority Data

Jul. 21, 2000 (JP) ........................................ 2000-220625
Jun. 25, 2001 (JP) ........................................ 2001-191452

(51) Int. Cl.⁷ ............................................... B41J 2/205
(52) U.S. Cl. ............................ 347/15; 347/43; 347/14
(58) Field of Search ............................... 347/15, 43, 14, 347/16, 19

(56) References Cited

U.S. PATENT DOCUMENTS

| | | | |
|---|---|---|---|
| 4,313,124 A | 1/1982 | Hara ............................. | 347/57 |
| 4,345,262 A | 8/1982 | Shirato et al. ................. | 347/10 |
| 4,459,600 A | 7/1984 | Sato et al. ..................... | 347/47 |
| 4,463,359 A | 7/1984 | Ayata et al. ................... | 347/56 |
| 4,558,333 A | 12/1985 | Sugitani et al. ............... | 347/65 |
| 4,608,577 A | 8/1986 | Hori .............................. | 347/66 |
| 4,723,129 A | 2/1988 | Endo et al. .................... | 347/56 |
| 4,740,796 A | 4/1988 | Endo et al. .................... | 347/56 |
| 5,225,849 A | 7/1993 | Suzuki et al. .................. | 347/43 |
| 5,717,448 A * | 2/1998 | Inada ............................ | 347/43 |
| 5,975,673 A | 11/1999 | Ohtsuka et al. ............... | 347/15 |
| 5,992,971 A | 11/1999 | Takahashi et al. ............. | 347/43 |
| 6,290,330 B1 * | 9/2001 | Torpey et al. ................. | 347/43 |

FOREIGN PATENT DOCUMENTS

| | | |
|---|---|---|
| EP | 0 921 006 | 6/1999 |
| JP | 54-56847 | 5/1979 |
| JP | 59-123670 | 7/1984 |
| JP | 59-138461 | 8/1984 |
| JP | 60-71260 | 4/1985 |
| JP | 11-188898 | 7/1999 |

* cited by examiner

*Primary Examiner*—Lamson Nguyen
(74) *Attorney, Agent, or Firm*—Fitzpatrick, Cella, Harper & Scinto

(57) ABSTRACT

An ink jet recording apparatus, for effecting recording on a recording material by ejecting a plurality of inks with relative scanning movement between a recording head and the recording material, includes an obtaining unit for obtaining relative information indicative of a relative relation between the amounts of inks to be ejected for each of unit areas provided by dividing an area in the neighborhood of a boundary between adjacent bands of scanning recording of the recording head across the recording material; a determining unit for determining, for each of the inks, a reduction rate at which the amount of the ink to be ejected to the neighborhood of the boundary in the unit area on the basis of the relative information for each of the unit areas obtained by the obtaining unit and on the basis of quantity information indicative of an amount of each into be ejected in the unit area; and a reducing unit for reducing the amount of each ink to be ejected to the neighborhood of the boundary on the basis of the reduction rate for each ink determined by the determining unit.

23 Claims, 21 Drawing Sheets

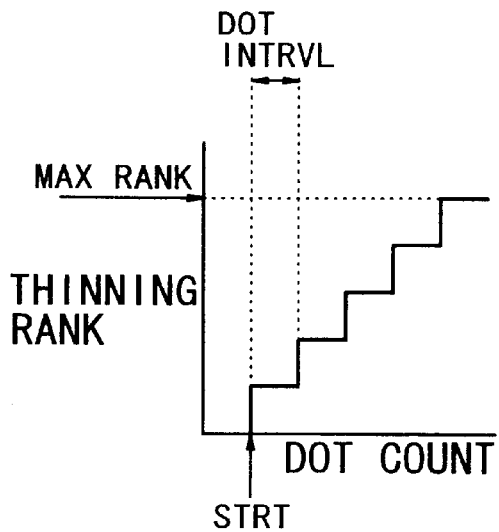
FIG. 10A
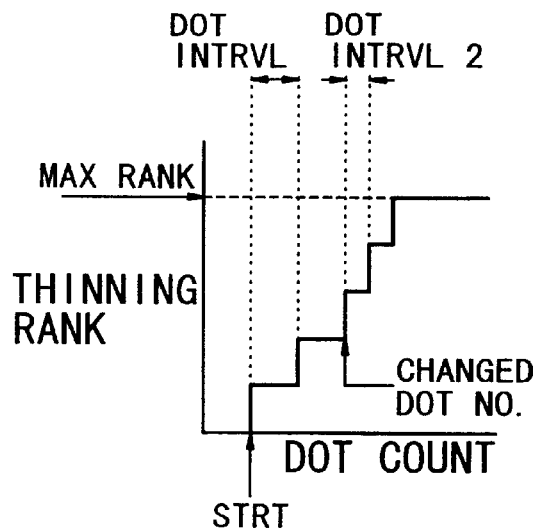
FIG. 10B
| THINNING LVL | COUNT | THINNING RATIO |
|---|---|---|
| 0 | 11111111 | 0/8=0% |
| 1 | 01111111 | 1/8=12.5% |
| 2 | 01110111 | 2/8=25% |
| 3 | 01010111 | 3/8=37.5% |
| 4 | 01010101 | 4/8=50% |
| 5 | 00010101 | 5/8=62.5% |
| 6 | 00010001 | 6/8=75% |
| 7 | 00000001 | 7/8=87.5% |
| 8 | 00000000 | 8/8=100% |
FIG. 11

(PRINT DATA) (COUNT)

○ × ○ ○ ○ × ○ × × × ○ ○ ×  01110111

ORGNL DATA

FIG. 14A

[1ST PRINT DATA]

BEFORE TREATMENT

○ × ○ ○ ○ × ○ × × × ○ ○ ×  01110111

AFTER TREATMENT

[2ND PRINT DATA]

BEFORE TREATMENT

× × ○ ○ ○ × ○ × × × ○ ○ ×  11101110

AFTER TREATMENT

[SMS TREATMENT]

ORGNL DATA

○ × ○ ○ ○ × ○ × × × ○ ○ ×

TREATED DATA

|  | (PRINT DATA) | (COUNT) |
|---|---|---|
|  | DISCHARGE SIDE |  |
| 1ST RSTR | ○○××○×○○ | 01110111 |
| 2ND RSTR | ○○××○×○× |  |
| 3RD RSTR | ○○××○×○○ | 01010101 |
| 4TH RSTR | ○○××○×○○ |  |
|  | INLET SIDE |  |

FIG. 15A

[1ST RSTR]
BEFORE TREATMENT
　　○○××○×○○　　　　01110111
AFTER TREATMENT
　　×○×××○×○×　　　　11101110

FIG. 15B

[2ND RSTR]
BEFORE TREATMENT
　　○○××○×○×　　　　11101110
AFTER TREATMENT
　　○○××○×××　　　　11101110

FIG. 15C

[3RD RSTR]
BEFORE TREATMENT
　　○○××○×○○　　　　10101010
AFTER TREATMENT
　　○×××○××○　　　　01010101

FIG. 15D

[4TH RSTR]
BEFORE TREATMENT
　　○○××○×○○　　　　01010101
AFTER TREATMENT
　　×○×××××○×　　　　10101010

FIG. 15E

| BEFORE TREATMENT | AFTER TREATMENT |
|---|---|
| ○○××○×○○ | ×○×××○×○× |
| ○○××○×○× → | ○○××○××× |
| ○○××○×○○ | ○×××○××○ |
| ○○××○×○○ | ×○×××××○× |

FIG. 15F

INK JET RECORDING METHOD, RECORDING APPARATUS AND DATA PROCESSING METHOD

FIELD OF THE INVENTION AND RELATED ART

The present invention relates to an ink jet recording method, a recording device and a data processing method in which high quality images can be formed on a recording material with suppressed banding nonuniformly, more particularly to the ink jet recording method, the recording device and the data processing method in which the recording is carried out through one-path or multi-path printing.

The present invention is applicable to any equipment using as the recording material, paper, textile, leather, nonwoven fabric, OHP sheet, metal or the like. More particularly, the present invention is applicable to a printer, copying machine, facsimile machine or another office equipment, industrial manufacturing machines or the like.

As regards the recording on the recording material using the recording apparatus, the demand for high-speed printing picks up. In order to increase the printing speed, it is one of the methods to refuse the number of paths in the multi-path printing which has been proposed to accomplish formations of high quality images. Here, the number of paths is the number of scans of the carriage required to complete one line of printing.

Since the number of ejection outlets of the recording head is limited, the amount of the sheet feed for units can be smaller if the number of paths is larger. On the other hand, the sheet feeding distance per unit can be increased by reducing the number of paths. For example, in the case that printing is carried out in the two-path mode, the speed can simply be doubled by changing it to one-path printing. That is, the reduction of the number of paths reduces the number of scans to cover a predetermined area (one sheet, for example), and increases the distance of sheet feed, so that time required for printing is shortened.

In the case that recording ahead having a plurality of ejection outlets for ejecting the recording liquid (ink) scans the recording material in the direction perpendicular to the direction in which ejection outlets are arranged, an image is formed in an image area in the form of a band by one scan of the recording head, as shown in FIG. 21.

Thus, in the case of the one-path printing, the duty (ratio) of the recording ink ejected per unit time is larger than when the one band area is printed through a plurality of scans (multi-path printing). Therefore, the production of the black stripe between the adjacent bands (paths) is remarkable at the portions where the printing duty is high, although it is different depending on the nature of the recording material and the recording liquid.

The problem is more significant in the case of lateral arrangement of the recording heads in which cyan, magenta and yellow recording heads or the like are arranged in the main scan direction. This is because the boundaries appear at the same position. FIG. 6 schematically shows the laterally arranged recording heads.

The black stripe appearing at the adjacent bands is called connecting stripe, spending or the like. It might deteriorate the image to such an extent that image is practically unsatisfactory.

Therefore, a method of avoiding the banding in one-path printing, thus improving the image quality, has been attempted.

For example, Japanese Laid-open Patent Application 11-188898 discloses a serial scanning type in which a recording head repeatedly scans the recording material in the main scan direction to print the image band by band, a method is used to avoid the production of a stripe at the connecting portion between the adjacent bands. More particularly, at least one of the first and the last raster lines of one band covered by one scan of the recording head is divided into a plurality of unit areas including a predetermined number of dots. In accordance with the image data, more particularly, with a sum of an amount of ink ejection for a noting color in each of the divided areas and an amount of ink ejections for the other in the unit areas, the amount of the ink actually ejected is reduced (thinning).

However, in the conventional method, the accuracy of the suppression of the banding in the case of plain paper or the like, with which the banding tends to occur, is poor.

SUMMARY OF THE INVENTION

Accordingly, it is a principal object of the present invention to provide an ink jet recording apparatus, a recording method and a data processing method with which the banding is suppressed even in the case of one-path printing.

According to an aspect of the present invention, there is provided an ink jet recording apparatus for effecting recording on a recording material by ejecting a plurality of inks with relative scanning movement between a recording head and the recording material, said ink jet recording apparatus, comprising obtaining means for obtaining relative information indicative of a relative relation between the amounts of inks to be ejected for each of unit areas provided by dividing an area in the neighborhood of a boundary between adjacent bands of scanning recording of said recording head on the recording material; determining means for determining, for each of the inks, a reduction rate at which the amount of the ink to be ejected to the neighborhood of the boundary in the unit area on the basis of the relative information for each of the unit areas obtained by said obtaining means and on the basis of quantity information indicative of an amount of each ink to be ejected in the unit area; and reducing means for reducing the amount of each ink to be ejected to the neighborhood of the boundary on the basis of the reduction rate for each ink determined by said determining means.

According to another aspect of the present invention, there is provided an ink jet recording apparatus for effecting recording on a recording material by ejecting a plurality of inks with relative scanning movement between a recording head and the recording material, said ink jet recording apparatus, comprising obtaining means for obtaining relative information indicative of a relative relation between the numbers of data corresponding to the inks to be ejected for each of unit areas provided by dividing an area in the neighborhood of a boundary between adjacent bands of scanning recording of said recording head on the recording material; determining means for determining, for each of the inks, a reduction rate at which the amount of the ink to be ejected to the neighborhood of the boundary in the unit area on the basis of the relative information for each of the unit areas obtained by said obtaining means and on the basis of the numbers of the data corresponding to each ink to be ejected in the unit area; and reducing means for reducing the data corresponding to each ink to be ejected to the neighborhood of the boundary on the basis of the reduction rate for each ink determined by said determining means.

According to a further aspect of the present invention, there is provided an ink jet recording apparatus for effecting recording on a recording material by ejecting a plurality of inks with relative scanning movement between a recording head and the recording material, said ink jet recording apparatus, comprising obtaining means for obtaining relative information indicative of a relative relation between the amounts of inks to be ejected for each of unit areas provided by dividing an area in the neighborhood of a boundary between adjacent bands of scanning recording of said recording head on the recording material; and reducing means for reducing an amount of each of the inks to be ejected to a neighborhood of a boundary in the unit area on the basis of the relative information for each of the unit area obtained by said obtaining means.

With the structure, the discrimination is made on the basis of the number of recording data (the number of dots to be printed) adjacent the boundary area as to the color area (hue and chromaticity) of a unit area (noting region), and the thinning rank is determined for each of the used inks and for each of the printing positions in accordance with the discriminated color area. By the thinning process for each of the inks using the thinning rank, the boundary stripe produced between the bands in a single path printing, can be suppressed.

These and other objects, features and advantages of the present invention will become more apparent upon a consideration of the following description of the preferred embodiments of the present invention taken in conjunction with the accompanying drawings.

BRIEF DESCRIPTION OF THE DRAWINGS

FIGS. 10A and 10B show an example of a thinning rank graph according to the first embodiment of the present invention.

FIG. 11 shows an example of the count in a SMS process according to the first embodiment of the present invention.

FIGS. 14A–D illustrate a print data processing using the SMS process according to the first embodiment of the present invention.

FIGS. 15A–F illustrate a print data processing using the SMS process according to the first embodiment of the present invention.

DESCRIPTION OF THE PREFERRED EMBODIMENTS

The preferred embodiments of the present invention will be described taking a serial printer having a plurality of recording heads for instance.

In this embodiment of the present invention, a neighborhood of a connecting or boundary portion of the data of one band is divided into a plurality of unit areas, and the number of dots for each of the unit areas are counted, and then, the color area of a noted area is discriminated on the basis of the dot counts for the respective colors. A thinning rank for each thinning process area is determined for each color on the basis of a predetermined thinning rank graph and a dot count (or printing duty) for each unit area provided by a sum of the dot counts for each color in the color area.

This will be further described.
(Position of Thinning Process)

Figure 5A:
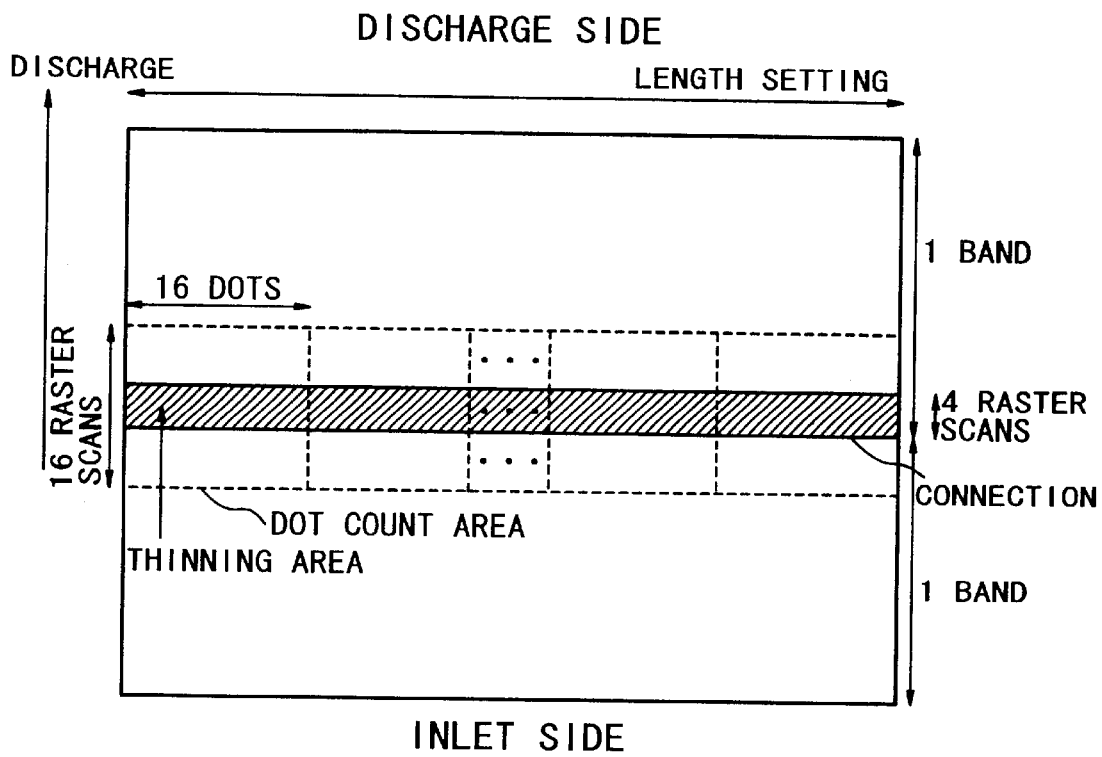
FIGS. 5A and 5B illustrate an area for which a dot counting operation of the print data is carried out and an area in which the thinning is executed.

As shown in FIGS. 5A, B, the area in which the thinning process is executed is several raster areas (4 rasters, for example) at a sheet inlet side (upstream side with respect to the feeding direction of the sheet) in one scan area to be printed. It is noted that thinning beforehand, that is, the thinning in the sheet feeding side is preferable than the other, since the margin relative to the recording material is large. By doing so, a larger number of recording materials can be supported than in the case that thinning processes effected at the sheet discharging side on the basis of one parameter.

When the thinning process is effected over several raster areas, the degrees (rank graph, in this example) of thinning can be independently selected for each raster areas or for each several raster areas, by which, for example, the degree of thinning can be made higher in the area closer to the boundary than in the other areas, thus improving the accuracy of the thinning process.

(Dot Count Area)

The area in which the dots are counted, as shown in FIG. 5A, is 16 dot×16 raster areas (dot) astride the boundary area. Since the area in which the dots are counted is larger than the thinning area so that print data of the bands astride the boundary are counted, the circumstances influential to the bleeding at the boundary can be taken into consideration.

(Thinning Processing Method)

The thinning process for the print data in this embodiment is a so-called SMS (sequential multi-scan) type. Other thinning processing methods include a type using a pattern mask and an error diffusion (ED) type.

Figure 22A:
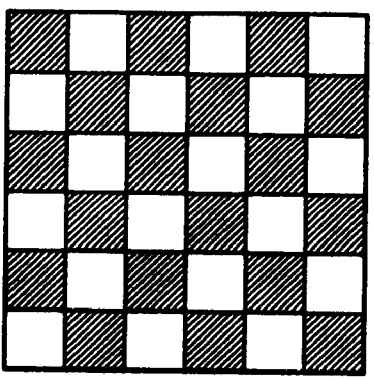
FIGS. 22A–E illustrate a thinning process using a mask according to an embodiment of the present invention.
Figure 22B:
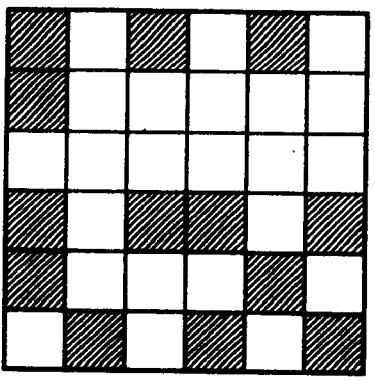
Figure 22C:
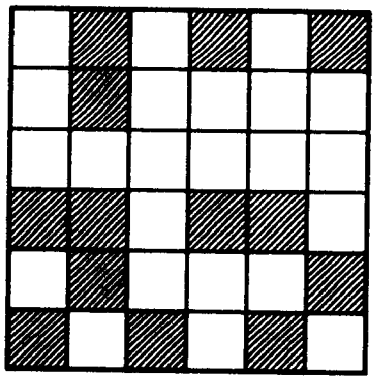
Figure 22D:
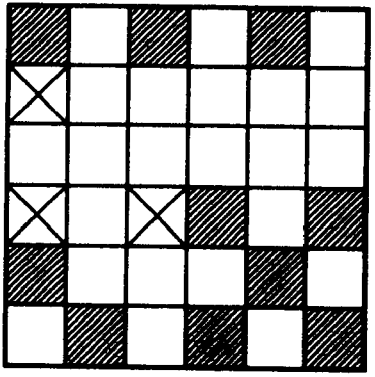
Figure 22E:
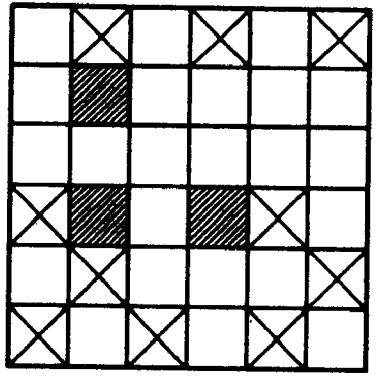

However, in the method using the pattern mask (FIGS. 22A–E), a mask of staggered arrangement is used for example (pixel data of white parts are skipped), and when the print data having the same amounts of ink ejections as shown in FIG. 22B. C, are processed, the data after the process are shown in FIGS. 22D and 22E, and the print data at the "x" portions are skipped. As will be understood from the two Figures, the thinning mask and the print data interfere in the case of the data of the same ejection amount (duty), depending on the arrangement of the print data, and therefore, the amount of thinning cannot be controlled in some cases.

As to the use of the error diffusion type, the following is an example.

If the pixel for which the quantitized image data process is to be effected, contains the data to be printed, a multi-level value is assigned in accordance with a predetermined nozzle correction value:

Errors of the peripheral pixels are added:

After comparison with a predetermined threshold, it is determined whether or not the print data is skipped or not:

The error resulting from the determination is calculated.

The error is assigned to a peripheral pixel or pixels: and

If the pixel for which the quantitized image data process is to be effected, does not contain, the errors in the peripheral areas are obtained and then are reassigned to the peripheral areas.

It is predicted that in the case of 1 path printing, the print data process requires too long time, since the recent high density nozzle head has many nozzles. If the printing operation is interrupted waiting for the data processing, the carriage has to stop with the result of low throughput which is against the purpose of use of one-path printing.

In view of this, in this embodiment, use is made of a so-called SMS thinning process to accomplish both uniformation of the amount of thinning and high speed processing. In the SMS thinning process, whenever there is a printing datum, the count designated by the counter (register) (particular bit; MSB, for example) is checked, and if it is "1", the print data is not skipped (printed), and on the other hand, if the counter value is "0", the print data is skipped (thinned) (not printed). The counter is shifted to the right (bit shift). When the counter is shifted to the right side end, it returns to the left end (cyclic shifting).

This is repeated for each of the print data to determine the dots to be skipped. As described in the foregoing, the determination whether the thinning is to be detected is carried out only for the dots having the print data, and therefore synchronism with the pattern of the print data does not occur.

(Thinning Table)

Figure 23A:
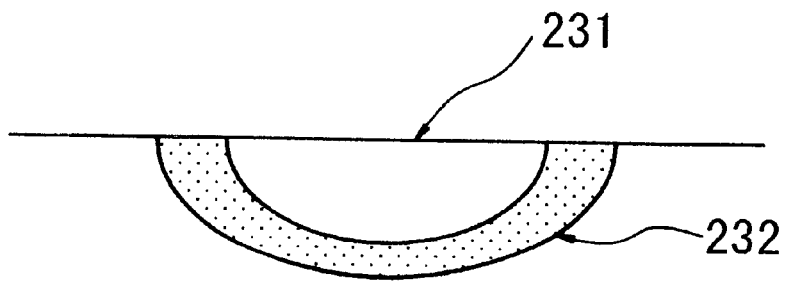
FIGS. 23A and 23B are schematic illustrations of behavior of the recording ink on the recording material.

The coloring at a marginal area of printed dot is different if the order of prints of inks on the recording material is different. FIGS. 23A, B schematically show an example of penetration of the recording ink into the recording material. The behavior of penetration of the recording ink is different depending on the material of the recording ink, the recording material, the ambient conditions, differences in the time interval between prints or the like, though.

Figure 23B:
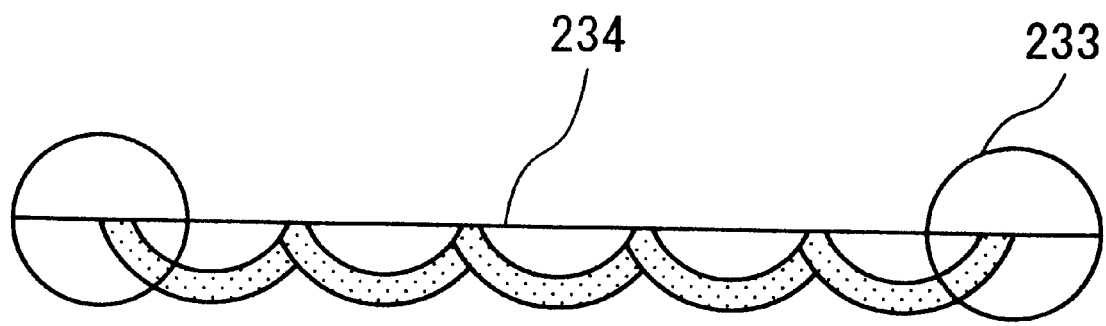

Here, the later printed recording ink 232 sinks under the first printed recording ink 231. In this manner, the recording inks printed onto the same position on the recording material do not mix with each other, usually, and the coloring occurs with the situation shown in FIG. 23A. It will be understood that the end 233 of the printing, indicated by a circle in FIG. 23B, has a coloring which is different from that inside 234. More particularly, the later printed ink has a stronger coloring than the first printed ink. This functions also to worsen the connecting seam at the boundary. Therefore, even if the same thinning rate is used for the recording ink to be first printed and the recording ink to be later printed, differences in the coloring at the marginal area are not avoided. Therefore, in this embodiment, the thinning rate is determined in consideration of the order of depositions of the ink onto the recording material.

FIG. 10A shows an example of a rank graph for a thinning to be used for determining the thinning rate in this embodiment. The thinning rank graph gives ranks corresponding to the dot counts in the dot count area for each of the inks which is subjected to the thinning process.

The thinning rank graph is designated on the basis of three values, namely, a start dot number, the dot interval and the MAX rank. The levels of the thinning ranks are determined beforehand. In this embodiment, for example, there are nine levels, namely, 0%, 12.5%, 25%, 37.5%, 50%, 62.5%, 75%, 87.5% and 100%.

The respective parameters will be described. The start dot number is the total dot count at which the use of the thinning rate 12.5% (thinning rank 1) is started. The dot interval is the dot count before the next thinning rate (25% if the current thinning rate is 12.5%), that is, the range of the dot count using the same thinning rate. MAX rank is the maximum thinning rate, that is, no thinning rate beyond that is not selectable. If the thinning rate reaches the MAX rank, the thinning rate is not raised, and the MAX rank thinning rate is maintained even if the dot count reaches the number corresponding to the dot interval.

Because of this system using the three parameters, one thinning line in the rank graph can be expressed by 1 bite ((8 bits); one component (8 levels) for the start dot number, one component for the duct interval (8 levels), and one component (4 levels) for the MAX rank 1.

In order to enhance the resolving power for each of the parameter, the number of bits may be increased. Alternatively, the number of bits is not changed, but a common offset value may be given commonly to the start dot number, the dot interval and the MAX rank, by which the parameters can be more accurately set.

In this manner, the amount of the data required for setting the thinning rank graph may be minimized. The reduction of the amount of the data is particularly preferable in this embodiment. The reason is as follows. In order to carry out the connecting processing as in this embodiment in the quick printing mode is in the one-path printing mode, use of hardware is preferred to the use of software. This is because the speed of the data processing using the software is not enough to catch up with the printing speed. It is preferable to use hardware such as a gate array. In this case, the number of required data is directly influential to the number of gates, and therefore, less data is preferable from the standpoint of the circuit scale.

FIG. 10B shows another example of the thinning rank. This example is particularly effective in such a case that inclination of the thinning rank line is desirably changed.

In addition to the three parameters required to express the thinning ranks, there are provided the change dot number indicative of the start point of the inclination change and the dot interval 2 for determining the new inclination, in this example. With use of such parameters, more accurate control is accomplished.

(Color Area Discrimination)

Depending on the relationship between the used ink and the recording material, the behavior on the recording material after the actual printing is different, and the conspicuousness of the boundary line and the effectiveness to the boundary line after the thinning process is also different.

For example, in the case of a gradation from white to blue and UC (under color, mixture of YMC), the printing is carried out using the cyan ink and the magenta ink where the color is changing toward blue, and at the position where the blue reaches the maximum level, the solid printing occurs for the cyan and magenta colors (the data of maximum duty). In the state, in order to reduce or suppress the boundary line, a certain high degree of thinning process is effected to the cyan and magenta colors.

Suppose that gradation from white to red and UC uses the same thinning parameters. Then, the cyan ink is first used at the point of change from the red at the maximum to the UC. At this point, the data for the magenta have the maximum duty level which is the same as the position where the gradation changes from the blue to the black in the foregoing white—blue—black gradation example, and therefore, the high thinning rate used for the cyan and magenta colors in the foregoing example is used in this example. This results in that a large percentage of cyan dots are removed in the area where the cyan dots are sparse, and therefore, lack of cyan dots is conspicuous.

Thus, it is desirable in the connecting process in the boundary area in the formation of color images that in addition to the conventionally used total amount of the ink to be applied to the unit area adjacent to the end portion, the information relating to the hue and the chromaticity of the unit area and the information as to which recording ink is used for printing is obtained, and that thinning rate is selectable on the basis of these pieces of information. In order to accomplish this, in this embodiment, the discrimination is made as to the hue and the chromaticity of the noting area (unit area) from the dot count for each color. In the following, the term color area is used as a word covering both of the hue and the chromaticity in combination.

In the foregoing embodiment, the color area of the noting area is discriminated from the number of recording data (the number of dots to be printed) in the neighborhood of the boundary area between adjacent bands, and in accordance with the color area, the thinning rank (the degree of thinning) can be selected for each of the used ink and the recording positions. Using the selected thinning rank, the thinning process is effected to each of the inks, so that conspicuousness of the boundary line between adjacent bands can be suppressed in the one-path printing.

The description will be made as to Details of this embodiment. The same reference numerals are assigned to the elements having the corresponding functions in the Figures.

(First Embodiment)

The first embodiment relates to a recording system in which the plurality of recording heads are used to effect recording on the recording material with recording ink.

(Example of Recording Device Structure)

Figure 1:
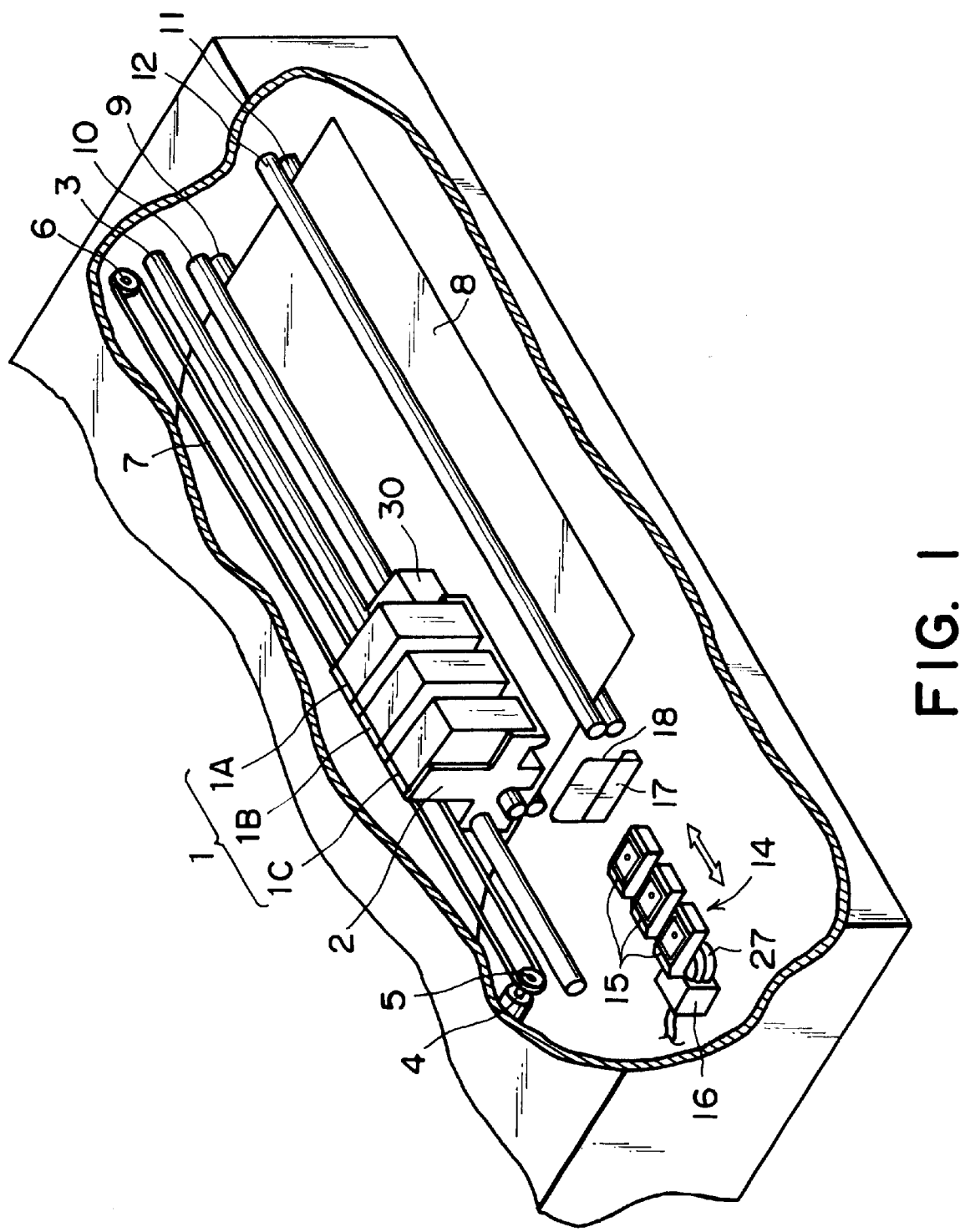
FIG. 1 is a partly broken perspective view of an ink jet recording apparatus according to an embodiment of the present invention.

FIG. 1 is a schematic perspective view of a major part of an ink jet recording apparatus according to the first embodiment of the present invention. In FIG. 1, a plurality of (3, in this embodiment) head cartridges 1A, 1B, 1C are replaceably mounted on the carriage 2. Each of the cartridges 1A–1C is provided with connector for receiving a signal for driving the recording head. In the following descriptions, when all the recording means 1A–1C, or any individual one of them, are designated, the term "recording means" (recording head or head cartridge) is used.

The respective cartridges 1 function to print different color inks. Therefore, the ink containers may contain different colors of cyan, magenta, yellow inks and so on. Each of the recording means 1 is exchangeably positioned and carried on the carriage 2 and the carriage 2 is provided with a connector holder (electrical connecting portion) for transmission of the driving signal or the like to each of the recording means 1 through the connector.

The carriage 2 is supported and guided on a guiding shaft 3 extending in the main scan direction in the main assembly of the apparatus, and is movable in the main scanning direction. The carriage 2 is driven and controlled by the main-scanning motor 4 through a motor pulley 5, a driven pulley 6 and a timing belt 7. The recording material 8 such as a sheet of paper, thin plastic resin sheet or the like is fed through a recording position where the recording material is faced to the ejection outlet side surface of the recording head 1 by the rotation of the two pairs of feeding rollers. The recording material 8 is supported on a platen (unshown) at the back side so as to provide a flat recording surface in the recording position. In this case, each of the cartridges 1 carried on the carriage 2 has the ejection outlet side surface which is projected downwardly from the carriage 2, and is supported to be parallel with the recording material 8 between the pairs of feeding rollers.

Figure 6:
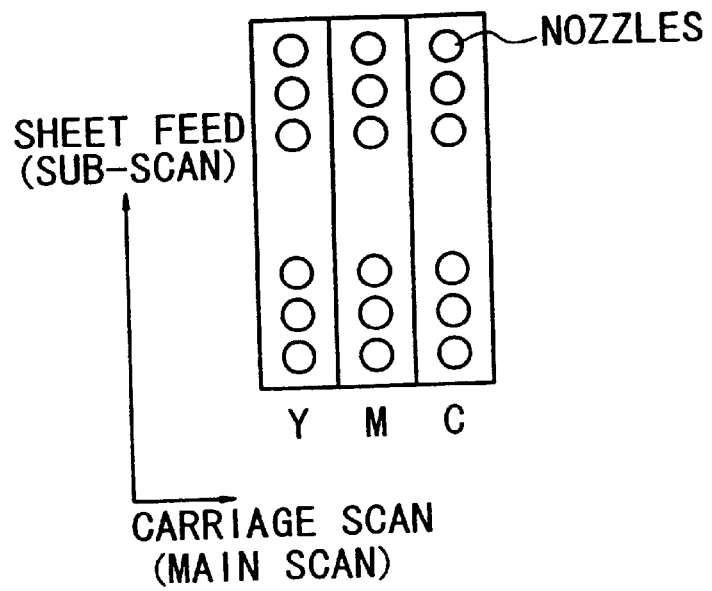
FIG. 6 is a schematic view illustrating a structure of the recording head according to the first embodiment of the present invention.

The recording head 1 is in the form of an ink jet recording means which ejects the ink using the thermal energy, and is provided with electrothermal transducers for generating thermal energy. In the recording head 1, film boiling is caused by the thermal energy applied by the electrothermal transducer. By the growth and collapse of the bubble created by the film boiling, a pressured change is produced so as to eject the ink. FIG. 6 illustrates a structure of nozzles of the recording heads.

Figure 2:
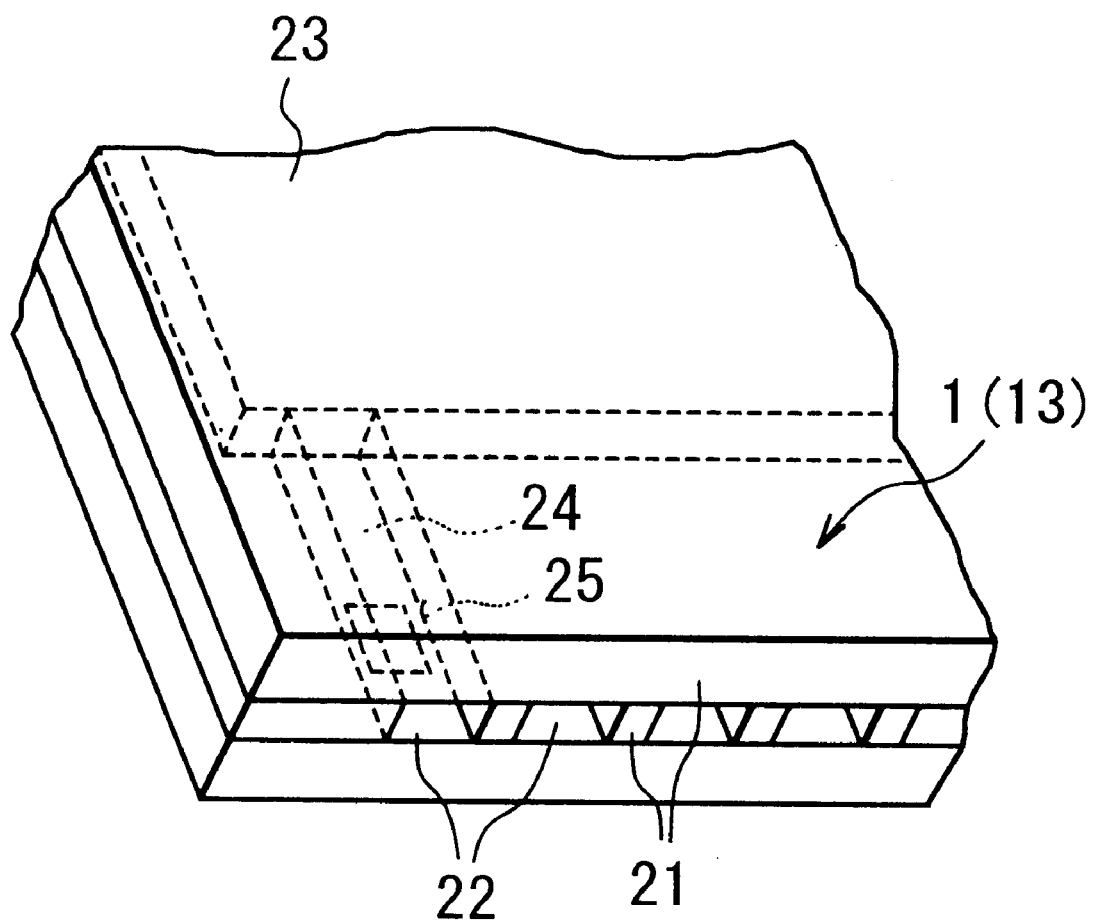
FIG. 2 is a schematic perspective view of a major part of a recording head used in the apparatus of FIG. 1.

FIG. 2 is a schematic perspective view illustrating a major part of an ink ejection portion 13 of the recording head 1. As shown in FIG. 2, the ejection side surface 21 is faced to the recording material 8 with a gap of approx. 0.5–2 mm, and is provided with a plurality of (256 in this embodiment) ejection outlets 22 at a predetermined intervals (360 dpi in this embodiment). The recording head further includes a common liquid chamber 23 and flow paths 24 for fluid communication between the common liquid chamber 23 and the ejection outlets 22. Each of the flow paths 24 is provided of the wall constituting the path with an electrothermal transducer 25 (heat generating resistor, for example) which is effected to generate energy corresponding to the amount of the ink ejection. In this embodiment, the recording heads 1 are carried on the carriage 2 in the manner that said ejection outlets 22 are arranged in the direction crossing with the scanning direction of the carriage 2. The electrothermal transducers 25 corresponding to the image signals or to the ejection signals are actuated (energized) to cause a film boiling in the ink in the flow path 24, and the pressure produced by the boiling functions to eject the ink through the ejection outlet 22.

Figure 3:
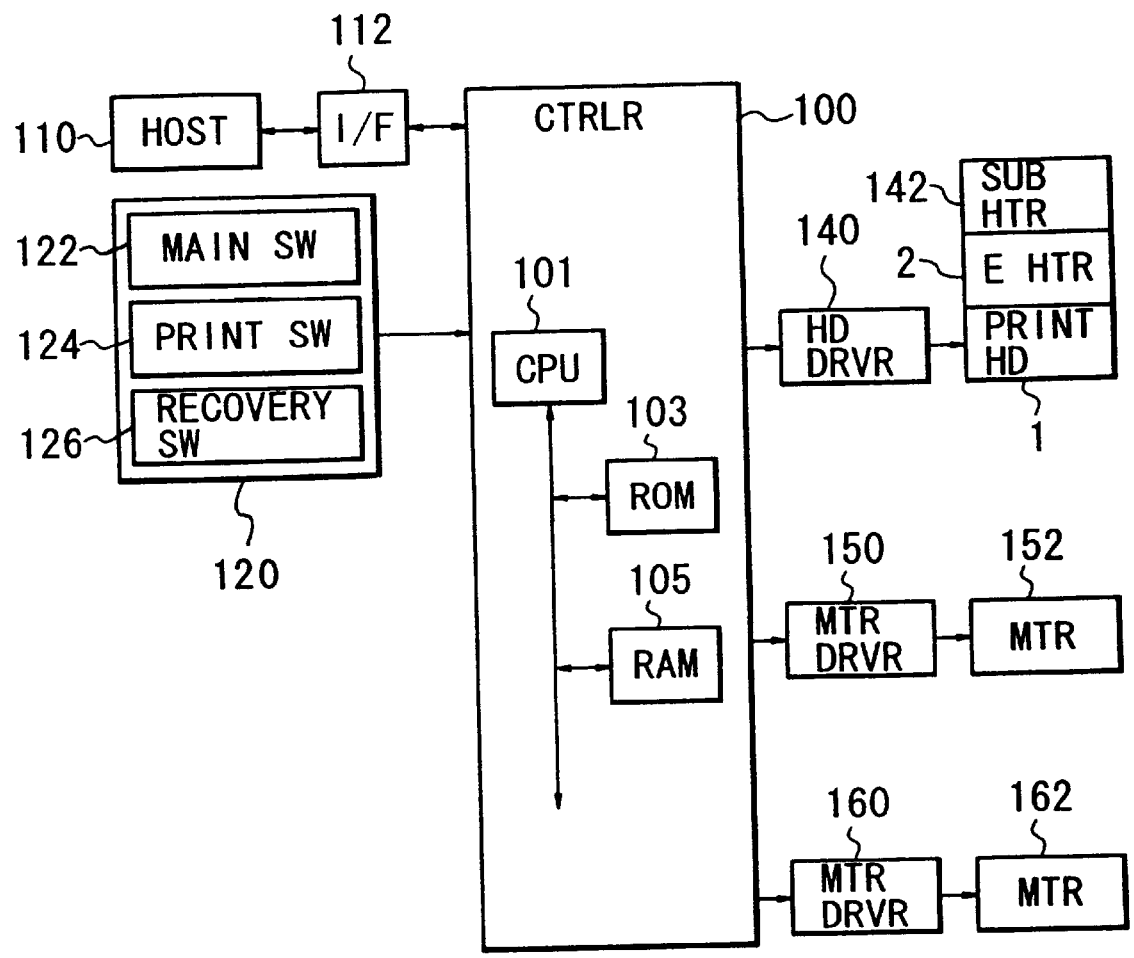
FIG. 3 is a block diagram of a control circuit for an ink jet printing apparatus according to an embodiment of the present invention.

FIG. 3 schematically illustrates a control circuit used in the ink jet printing apparatus shown in FIG. 1.

In FIG. 3, a controller 100 constitutes a main controller and includes a CPU 101 in the form of a microcomputer, a ROM 103 storing a program, a table, fixed data or the like, and a RAM 105 providing an area for conversion of the image data and a working area. The host apparatus 110 is the supply source of the image data, and it may be a computer which produces and processes image data or the like relating to the printing, or it may be a reader portion for reading images. The image data, the command, the status signal and the like are supplied to or received from the controller 100 through an interface 112(I/F).

An operating portion 120 includes a group of switches operable by the operator, including a main switch 122, a print start switch 124, and a recovery switch 126 for actuating a suction recovery operation.

A head driver 140 actuates the ejection heaters 25 of the print head 1 in accordance with the print data or the like. The head driver 140 includes a shift register for aligning the print data corresponding to the positions of the ejection heater 25, a latching circuit for effecting latching at proper timing, a logic circuit element for actuating the ejection heater in synchronism with the drive timing signal, a timing setting portion for properly setting the actuation timing for correct positioning of the dot formation.

The print head 1 is provided with a sub-heater 142. The sub-heater 142 functions to control the temperature in order to stabilize the ejection property of the ink, it may be formed on the print head substrate simultaneously with the ejection heater 25, or it may be mounted to the main assembly of the print head or the head cartridge.

The motor is to drive the main-scanning motor 152, and the sub-scan motor 162 is for feeding the print medium 8 (sub-scan), the motor driver 150 is a driver for the motor.

(Print Data Process)

Figure 4:
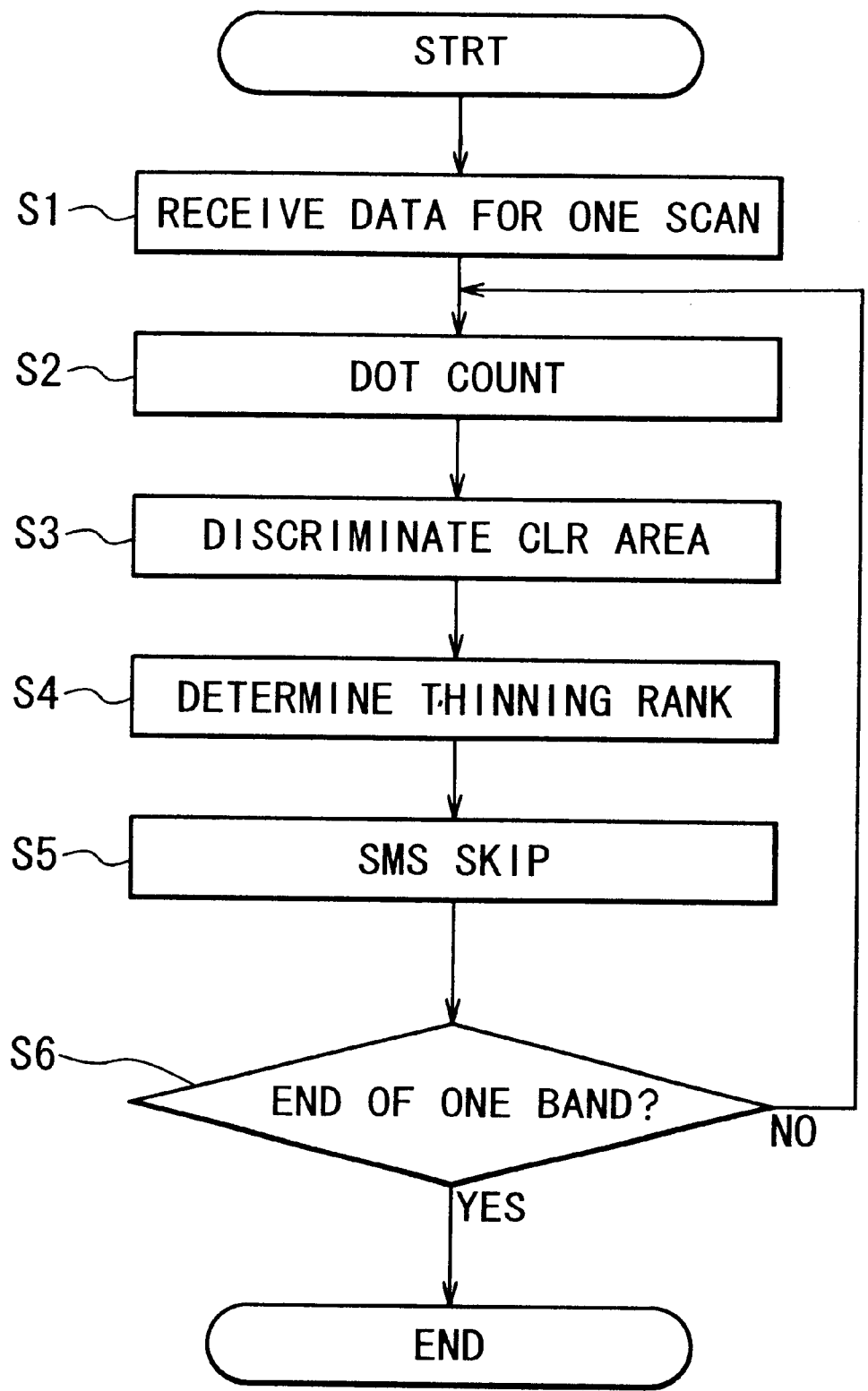
FIG. 4 is a flow chart of process steps according to a first embodiment of the present invention.

FIG. 4 is a flow chart showing operations from the reception of the amount of the print data corresponding to one scan to the end of the print data process.

At step S1, the amount of the print data required for printing one scan for each of the different color inks is received. For the printing of one scan, the data for one band is necessary, and the data in the dot count area of the next band is required as well. Here, one band is a printing area printed by one carriage scanning operation.

Figure 5B:
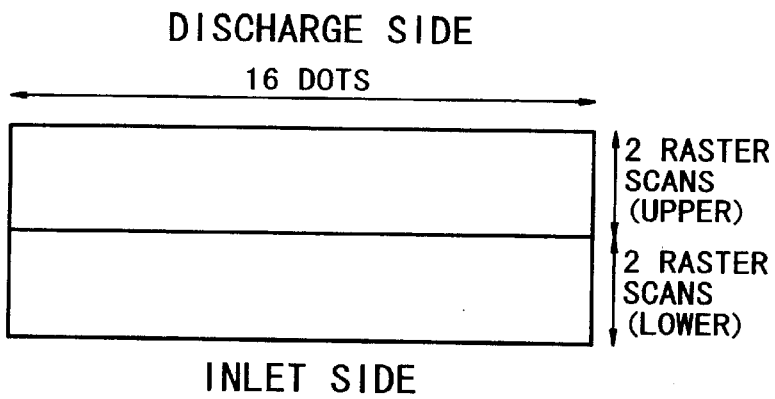

After the print data is received, a step S2 executes the dot count operation, a step S3 executes the color area discrimination, a step S4 executes the thinning rank determining operation, and a step S5 effects the SMS thinning process, for each of the unit areas, that is, each of 16 dots×16 dots raster areas shown in FIG. 5. At step S6, the foregoing process is repeated until one band is covered. The description will be made as to the respective processes.

(Dot Count)

In this embodiment, the area subjected to the dot count operation is a width corresponding to the 16 raster lines including the connecting portions between adjacent bands.

The dot count operation is carried out for all of the recording inks carried on the recording device of this embodiment, more particularly, the dot count operation is carried out for the binary data for the cyan, magenta and yellow colors. A sum of the dot counts of them is the dot count (or the total dot count) as a result of the dot count operation.

Here, the event that dot count is "1" means that one dot is present in one pixel, and the event that dot count is "2" means that two dots are present in one pixel.

The dot count operation is carried out in the divided areas adjacent to the boundary between adjacent bands, and the size of the area is 16 raster lines in the sheet discharging direction, and 16 dots in the scanning direction of the carriage (unit area for the dot count). Therefore, the maximum of the total dot count value is 16 (raster)×16 (dots)×3 (color number)=768.

In the process of this embodiment, the thinning rank is determined from the total dot count obtained by the dot count step, and the SMS thinning process is carried out. It is possible to obtain relative information indicative of the relative relation among the amounts of the inks printed in the unit areas, from the dot counts for each of the colors, and the discrimination is made as to the color area (hue and chromaticity) of the unit area from the relative information.

Such a process is repeated for one band until all of the bands corresponding to one page are subjected to the process, so that print data are generated.

Therefore, in the case of 360 dpi A4 full scanning (8 in.), 180 calculations (360 (dpi)×8 (inch)/16=180) are to be carried out.

In this embodiment, the total dot count is the simple total sum of the dot counts of the cyan, magenta and yellow colors, but the counts may be weighted depending on the colors when the degrees of influence to the production of the boundary strike are not uniform. For example, in a case, the conspicuousness of the boundary line is worsened by the yellow ink, then, the dot count for the yellow color may be weighted, for example, the dot count of the yellow is multiplied by 1.2. In another case, the ejection amounts are different depending on colors (for example, in the amount of the ejected red ink is larger than the other, then, this is taken into account.

Using the dot count process as described in the foregoing, the data processing may be carried out only for the small areas which is adjacent to the boundary between bands (that is, the end portion of the array of the nozzles. Therefore, the load required by the process is small, such that even in the case that time period which can be given to the process is short as in the case of one path printing.

The description will be made as to the reason why the 16 dots×16 dots area astride the boundary between the adjacent bands is selected as the unit area in which the dot count operation is carried out.

In this case, the maximum value of the total dot counts is 16×16×3 (the number of colors)=768. In order to form 1 band, 180 calculations are required in the case of 360 dpi, as described hereinbefore, and in the case of 600 dpi, A4 full scanning (approx. 8 in.), the number of calculations is 600 (dpi×8 (inch)/16=300. More specifically, as shown in FIG. 5A, the dot count operation is sequentially carried out for each of the dot count unit areas for all of the range determined by the set length, and the operations are carried out for all of the dot count unit areas, by which the dot count operation for 1 band is completed.

By using the areas astride the boundary between the adjacent bands in this manner, the state of print dots before and after the boundary can be known. More particularly, it is possible to discriminate whether or not the ink ejections tend to produce the boundary line, and therefore, a high precision boundary processing is accomplished. When the dot count operation is carried out only for the areas within one band, it is possible to predict the degree of ink bleeding attributable for the production of stripes within the band, but it is not possible to predict the degree of influence to the next band. The production of the boundary line or stripe is dependent on the amount of the ink adjacent the boundary between the adjacent bands.

For example, when a certain quantity of ink is in the next band, the boundaries stripe is suppressed due to the ink bleeding. When the amount of the ink is small, the possibility of the production of the stripe is not high, although the ink bleeding may occur.

Figure 13A:
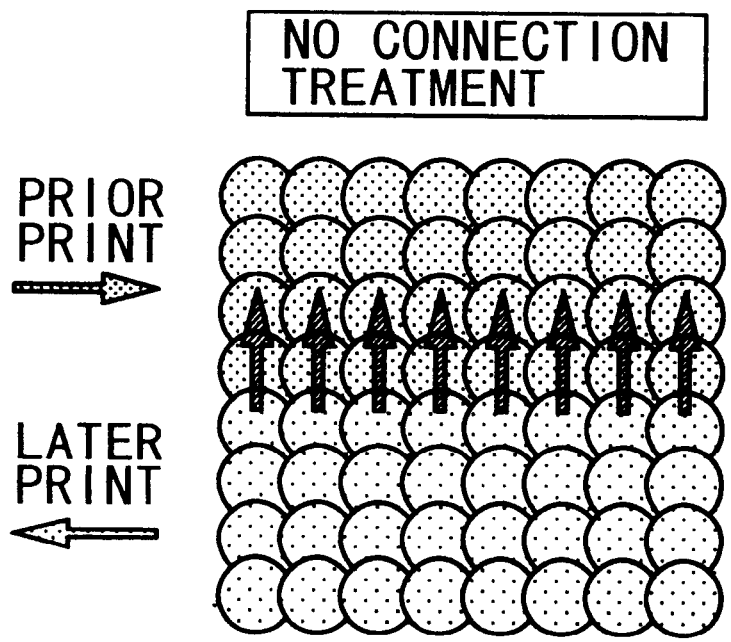
FIGS. 13A and B illustrate a mechanism of ink bleeding occurring at the connection between adjacent bands.

Referring to FIGS. 13A, B, the description will be made as to the mechanism of the stripe production.

To the place where the shot ink is being fixed with some bleeding, the next band ink is shot. Then, in the process of the next ink penetrating into the material of the sheet or on the surface thereof, the next ink is considered as being attracted to the ink of the previous shot. At this time, if no processing is given to the boundary area, the amount of the ink at the boundary becomes larger, is shown in FIG. 13A with the result of a darker boundary. This is considered as the cause of the production of the stripe.

Figure 13B:
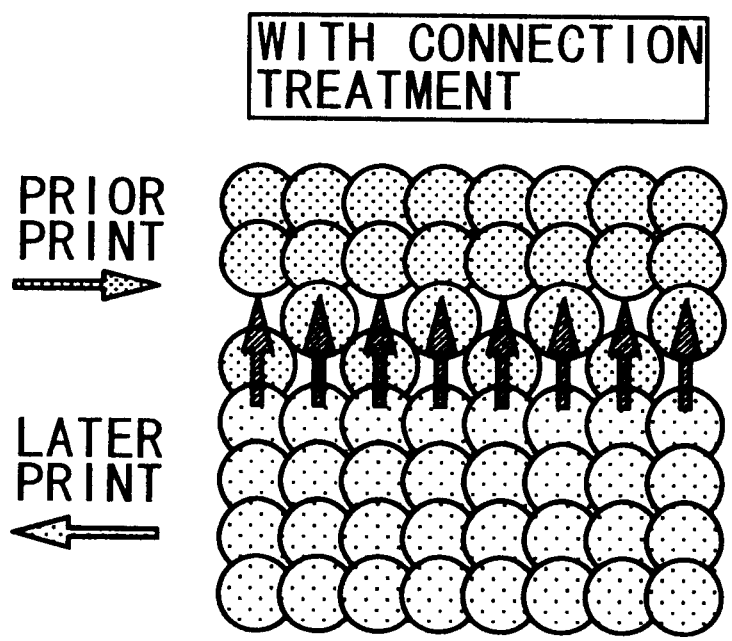

In order to avoid this, the boundary processing is carried out as shown in FIG. 13B to reduce the amount of the ink either in the first or second band, that is, the print data are thinned. The thinning process may be carried out in one of the first and second bands or in both of them.

As described in the foregoing, the production of boundary stripe is attributable to the amounts of the ink in the adjacent bands. Therefore, the selection of the areas to be processed extending astride the boundary is effective for the processing.

At the time of the dot count operation, the data for the first band or the second band may be weighted. For example, when the cause of the stripe production is the amount of the ink, the dot count of the first shot band may be multiplied by 1.2, so that amount of the ink in the first band may be sensitively taken into account.

(Color Area Discrimination)

Figure 7:
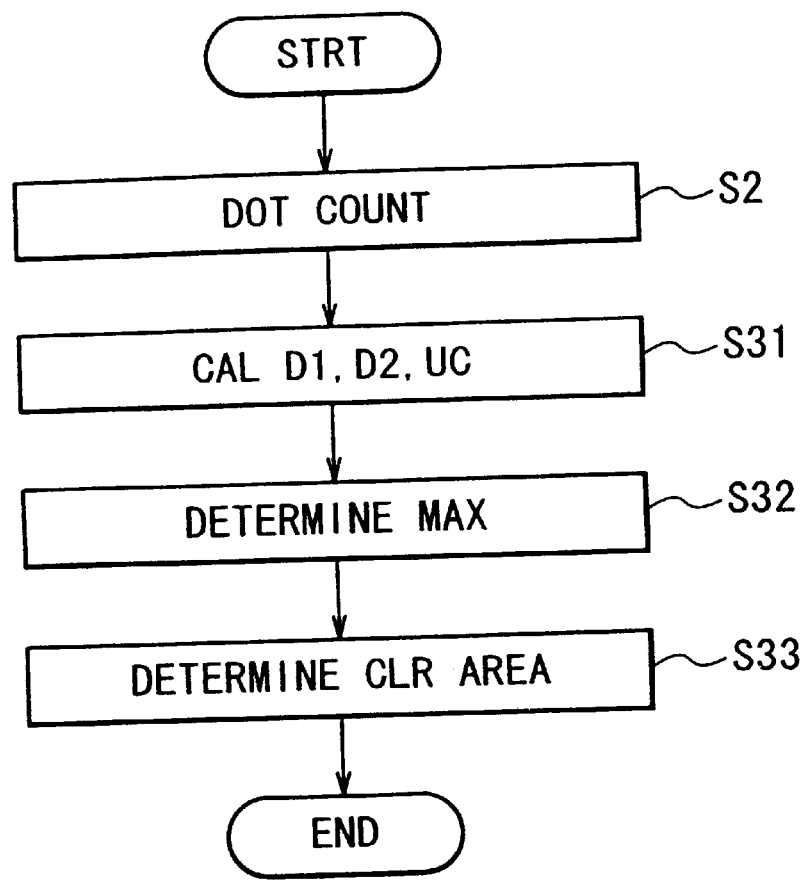
FIG. 7 is a flow chart of color area discrimination steps according to the first embodiment of the present invention.

FIG. 7 is a flow chart for the color area selection.

Figure 8:
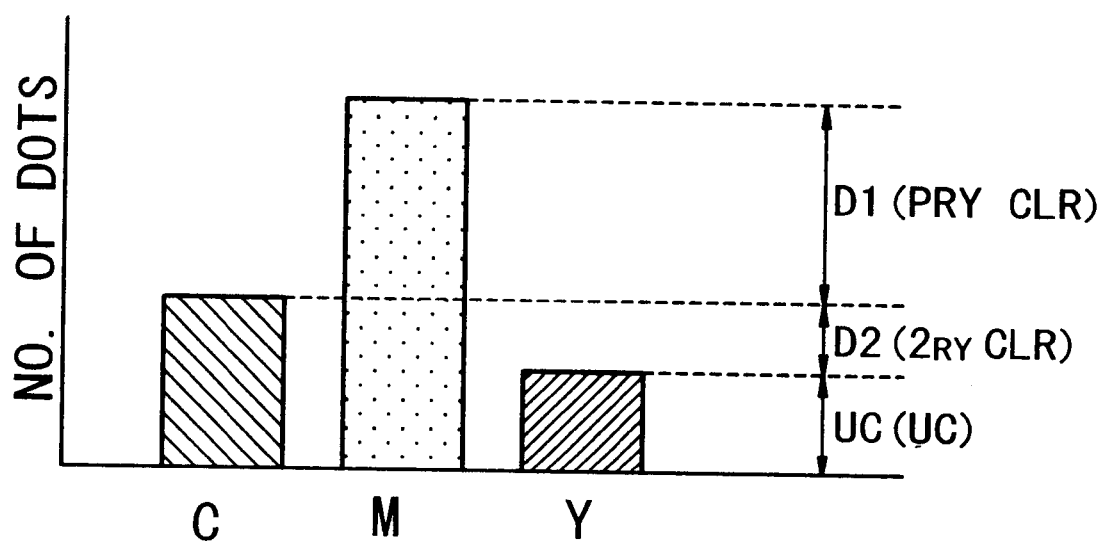
FIG. 8 is a schematic illustration of an example of a dot count in a unit area according to the first embodiment of the present invention.

At step S2, the dot count operations are carried out for the respective colors. FIG. 8 shows an example of dot count in a unit area, and FIG. 9 shows sections of color areas used in this embodiment.

In the example of FIG. 8, the order of the number of dots, from largest to smallest by color, is the magenta, the cyan and the yellow dots. The portion of yellow with which the dot count is the minimum among the three colors is called "UC" (under color), the portion resulting from the cyan (second largest) deducted by the UC is the secondary color (D2, blue in this embodiment) portion. The portion of the magenta (the largest) detected by the second largest cyan is the primary color (D1, magenta in this embodiment). The D1, D2, UC are calculated in step S31.

Figure 9:
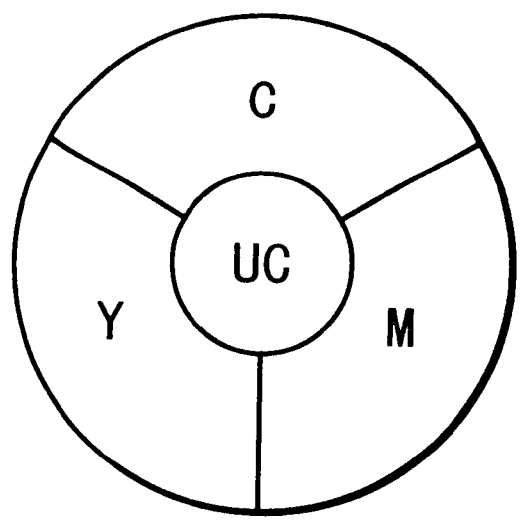
FIG. 9 shows an example of the sections of the color areas according to the first embodiment of the present invention.
Figure 12A:
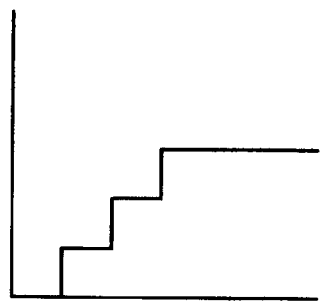
FIGS. 12A to F show an example of a thinning rank graph according to the first embodiment of the present invention.
Figure 12B:
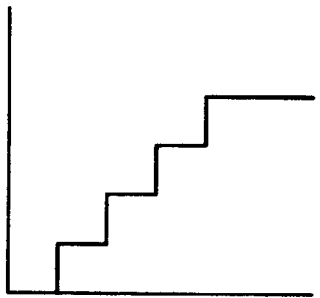
Figure 12C:
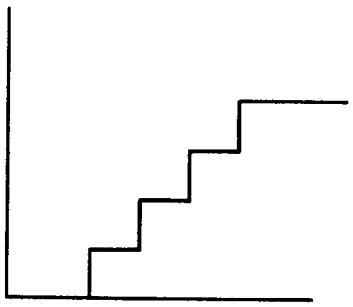
Figure 12D:
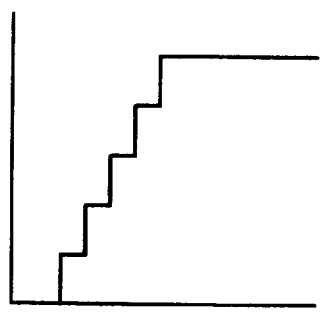
Figure 12E:
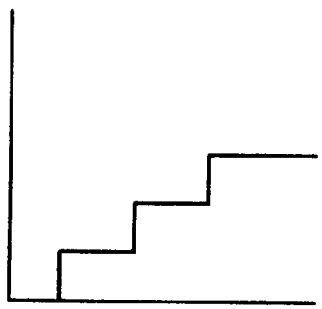
Figure 12F:
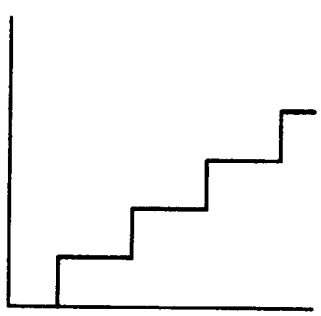

The largest among the D1, D2, UC is discriminated, by which the position of the noting dot count area (unit area) in FIG. 9 is determined (step S32). In this example, D1 is the largest, and therefore, it is discriminated that dot count area is in the cyan.

If there are two or three largest number portions in the D1, D2, UC, the color area is selected in the order of UC, D2, D1 (if UC and D2 are the same, UC, is selected; if D1 and D2 are the same, D2 is selected, and therefore, D1 is not used actually).

(Thinning Rank Graph)

FIG. 10A shows an example of a rank graph for determining the thinning rank.

Here, FIG. 10A plots the total dot count (ordinates) vs. the thinning rank corresponding to the thinning rate (abscissas). Using the graph, the thinning rate for the data (count in the SMS processing) is designated on the basis of the total dot count for the unit area, obtained by the dot count process.

In these embodiments, the thinning rates are one of 0%, 12.5%, 25%, 37.5%, 50%, 62.5%, 75%, 87.5%, 100% (nine levels). The counter value is shown in FIG. 11.

As described in the foregoing, the designation of the thinning rank graph is determined on the basis of the number of the start dot, the dot clearance and the MAX rank.

FIG. 10A also shows the correspondence of the three parameters and the thinning rank graph.

In this embodiment, as described in the foregoing, in the three parameters are the start dot number, the thinning clearance and the MAX rank, in accordance with which the thinning rank graph is selected. However, this way of selection is not limiting in the present invention. In view of the fact that with the foregoing method of determination of the thinning rank graph, the relation between the total dot count number and the thinning rate cannot be other than linear, another method is such that thinning rank graph per se is speculated.

The number of levels of the thinning rates is not necessarily limited to nine, but may be increased as desired.

FIG. 12 shows an example of the thinning rank graph used in this embodiment. As described in the foregoing, the thinning rank graph is determined properly for each color, and FIGS. 12A–F show an example for one color area (cyan).

In this embodiment, the thinning rank is designated for each of different inks (cyan, magenta and yellow). The thinning area is divided into two portions in the sheet discharge direction (sub-scan direction), and the thinning rank graphs are selected independently from each other. Therefore, in FIGS. 12A–F, six thinning rank graphs are used (cyan upper, cyan lower, magenta upper, magenta lower, yellow upper and yellow lower).

In addition, FIGS. 12A–F show only the graphs for the color areas (cyan in this example) discriminated as a result of color area discriminating operation. Actually however, such a combination is present in each of the magenta, the yellow and the UC.

By setting the thinning rank graph for each of different inks, the control can be responsive to the difference in the degree of the boundary stripe due to the difference in the behavior on the recording material depending on the inks, the difference in the conspicuousness due to the difference in the lightness and/or the chromaticity depending on the inks.

Additionally, the thinning rank graph can be set for each color, and the process can be responsive to the change in the color at the end portion resulting from the order of shots onto the recording material. The change in the color, for example, at the end portion may occur as in the following manner. As described referring to FIGS. 23A and 23B, the behavior of the ink is dependent on the time difference of the ink ejections onto the recording material and on the property of the recording material, but in the case that time difference of the ejections is very short because of the lateral arrangement of the recording heads, an outline bordering of magenta color is produced when the cyan and magenta inks are shot at the same position on plain paper, for example. In such a case, that is, the outline color change occurs, the changing of the thinning rate is effective. More specifically, in the case of the shots in the order of cyan ink and magenta ink, the thinning ratio for the magenta is made higher than that for the cyan, by which the boundary stripe can be suppressed more.

(Thinning Process Area)

In this embodiment, as has been described in the foregoing referring to FIG. 5A, the data of 4 raster areas at the sheet feeding side in one band are processed, and therefore, the data in the area of 16 dots in the main scan direction are processed. Furthermore, as shown in FIG. 5A, the 4 raster areas are divided into 2 raster areas at the sheet discharge side (upper) and 2 raster areas at the sheet feeding side (lower). For each of the defined areas, the thinning tank can be selected, that is, different thinning rank graphs are prepared.

As will be understood from FIG. 5A, the thinning area and the dot count area used in this embodiment are not the same area, but only a part of the dot count area is the thinning area. It is not necessary that thinning area and the dot count area are the same.

This is because the causes of the production of the boundary stripe is not so simple that problem may be solved by the boundary per se, but it is considered that ink bleeding between the bands and the ink bleeding away from the portion by several raster lines propagates through chain reaction depending on the connections of the dots. For example, the boundary stripes are different between when the ink is ejected only for 4 raster lines at up to the boundary and when the ink is ejected for 8 raster lines. More particularly, the stripe is more remarkable in the latter. Because the ink bleeding occurring at the position several rasters away from the boundary gradually propagates with the result of the amount of the ink at the boundary is relatively large, and therefore, the boundary stripe is relatively remarkable. Therefore, it is desirable that dot count area is larger than the thinning area and is determined in consideration of the chain reaction propagation of the ink bleeding. In this embodiment, the dot count area twice as large as the thinning area.

As regards the size of the thinning area, it is desirable that it has a certain area from the standpoint of effectiveness of the processing. If, however, it is too large, the density may become too low due to the thinning process with the possible result of a white stripe. In view of these factors and properties, the proper width of the thinning area is determined. In this embodiment, the thinning area has a width corresponding to the 4 raster areas (0.17 mm in the case of 600 dpi). This is effective to suppress the boundary stripe without inducing the white stripe.

In these embodiments, 4 raster lines are used for the thinning process area, and the area is divided into two parts. This is not limiting, and it may be divided into four parts, that is, the rank graphs are assigned to the respective raster lines.

By the further deviation of the thinning area and the independent assignment of the thinning table for each of the divided areas, proper thinning rates and the thinning areas can be selected depending on the degrees of the boundary stripes.

As described in the foregoing, the causes of the production of the boundary stripe are not so simple that chain reaction from the ink bleeding occurring at the position several raster lines away from the boundary is desirably taken into account. Therefore, it is more effective to process the neighborhood of the boundary in view of the ink bleeding than to process the boundary portion only. The one raster or two rasters at the boundary is a cause of the production of the boundary stripe. The degree of the influence changes away from the boundary (by one raster line, two raster lines, three raster lines, etc.). Adjacent to the boundary, the raster lines in an area is concerned with the production of the boundary stripe, and the degrees of the influences are different.

In view of this, the thinning ranks are determined for the respective raster lines. In addition, the thinning ranks are determined in accordance with the distance from the boundary, by which the accuracy of the processing is improved.

(SMS Thinning Process)

In the SMS thinning process, the designated count (specified bit, for example, MSB in this embodiment) is read by the counter (register) each time the print data is supplied, if it is "1", the print datum is printed, and then the counter is shifted rightward by "1". If the counter "0", the print data is thinned, and then the counter is shifted rightward by "1". When the counter reaches the rightmost position, it is returned to the leftmost position. The process is repeated each time the print data it supplied, thus determining the dots to be skipped.

Referring to FIGS. 14A–D and FIGS. 15A–F, the SMS thinning process will be described. In these figures, the print data are indicated by "o", and no print datum is indicated by "x". The noting datum is indicated by bolding. As regards the counter value, the portion to be printed is indicated by "1", and the portion to be skipped is indicated by "0", and the column designated by the counter is indicated by bolding.

In FIG. 14A, the first print datum is "o", and the count is 0, and therefore, the first data is skipped or removed. Therefore, the first print datum after the processing is "x", and the counter shifts by one to the right (FIG. 14B). The next datum is not indicative of printing, and is maintained "x", and the counter does not shift and is retained there (FIG. 14C). The third print data has the counter value of "1", and the print datum remains, and the counter is shifted by one to the right. In this manner, the print data are skipped at the ratio of 1 out of 4 (FIG. 14D).

FIGS. 15A–F shows an example of the data before and after the thinning process in which the thinning process is effected in the area defined by 8 dots in the main scan direction and 4 raster lines in the sheet discharge direction (one half in the main scan direction) since the thinning process area is constituted by 4 raster lines, in this example, the thinning ranks are "2" at the sheet discharge and "4" at the sheet feeding side, respectively.

For the best understanding, the raster lines are called "first raster", "second raster", "third raster", "fourth raster" from the sheet discharge side in FIG. 15A.

The SMS thinning process is carried out from the sheet discharge side raster for each of the rasters. After the processing for one raster, the next raster is processed. The SMS counter does not return to the initial position even if the thinning level is changed. The SMS counter does not return to the initial position even if the thinning process area is shifted to the adjacent area within the same band, and the counter position is retained in one band. When the operation is shifted into a different band, the counter position is returned to the initial position.

The initial position in the first process area in one band is randomly designated. As a result, the processing from the first raster to the fourth raster is as shown in FIG. 15B, and it is as shown in FIG. 15F as a whole.

According to this embodiment of the control method, the color area of the noted area is discriminated from the number (the number of dots to be printed) of the recording data in the neighborhood of the boundary, and, in accordance with the color area, the thinning rank can be selected for each of the inks used. By effecting the thinning process for each of the inks in accordance with the set thinning rank, the degree of production of the boundary stripe in one-path printing can be suppressed.

(Second Embodiment)

The second embodiment of the present invention is similar to the first embodiment in that printing is effected with the recording ink onto the recording material using a plurality of recording heads.

The structure of the recording device used in this embodiment, the thinning process area and the SMS thinning process in this embodiment are the same as those in the first embodiment.

(Dot Count)

In this embodiment, the dot count unit area is the same as with the previous embodiment.

Figure 16A:
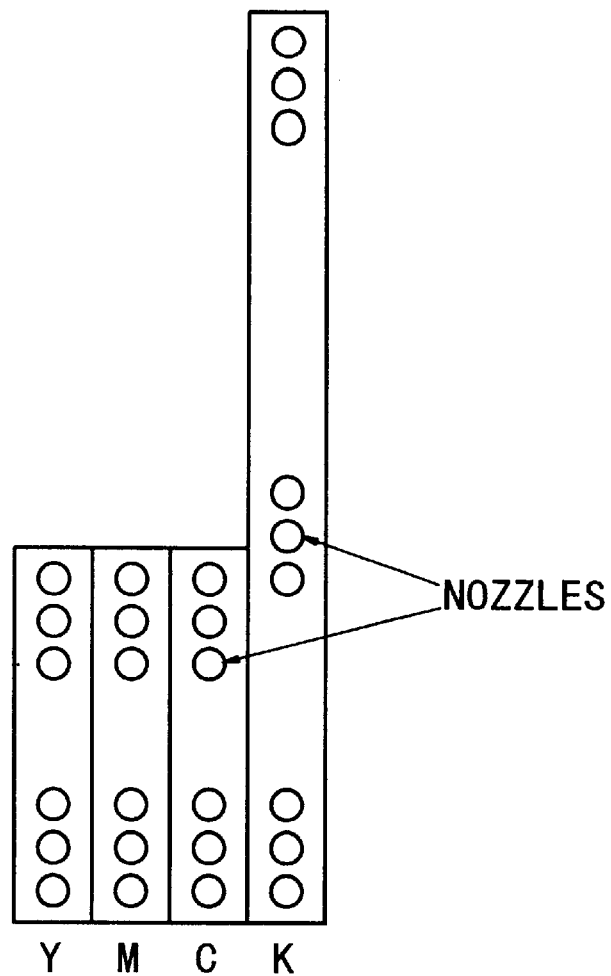
FIGS. 16A–C are schematic illustrations of a recording head according to a second embodiment of the present invention.

FIG. 16A shows a head structure used in this embodiment.

Figures 16B, 16C:
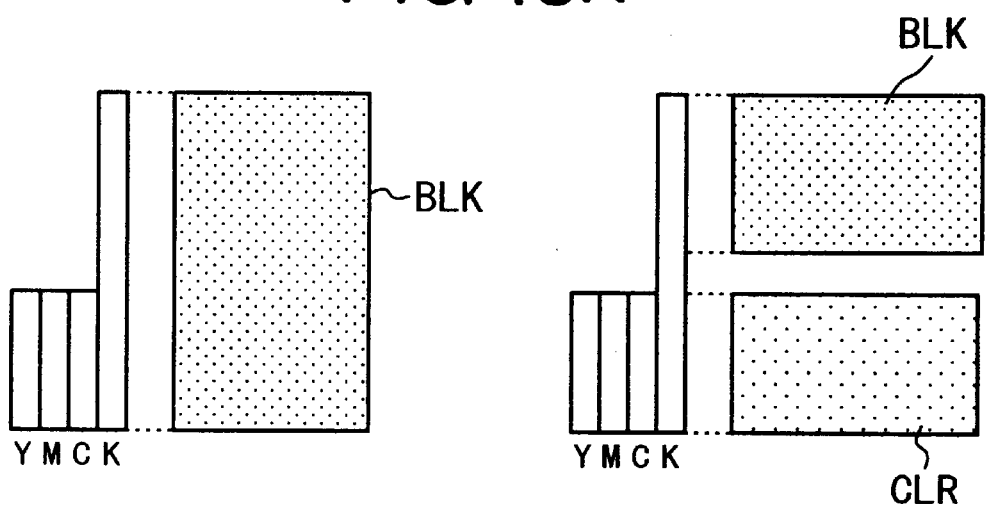

With this structure, the number of nozzles for ejecting the black ink is not less than twice as many as the number of color nozzles, so that when the data contain only black data, the black nozzles are fully used to raise the printing speed. In the case of the mixture of black and chromatic data, the number of black nozzles to be actuated is reduced in order to suppress the bleeding among the black dots, and in the case of the black and color printing, at least one scan black is given. FIG. 16B schematically shows the printing of black data only, and FIG. 16C schematically shows the printing of black and chromatic data in mixture.

The boundary stripe tends to occur in the case of the color printing since the amount of the ink is large on the recording material. In this case, the black printing is carried out prior to the color printing with the nozzles structure in this embodiment. Therefore, at the time of the color printing, the black ink printing has already finished, and the black ink has started fixing on the recording material. For this reason, the black ink is not influential to the boundary stripe.

In this embodiment, the dot count is not carried out for the black ink, accordingly. But, the color inks (cyan, magenta and yellow) only are subjected to the dot count, for the boundary processing.

(Color Area Discrimination)

Figure 17:
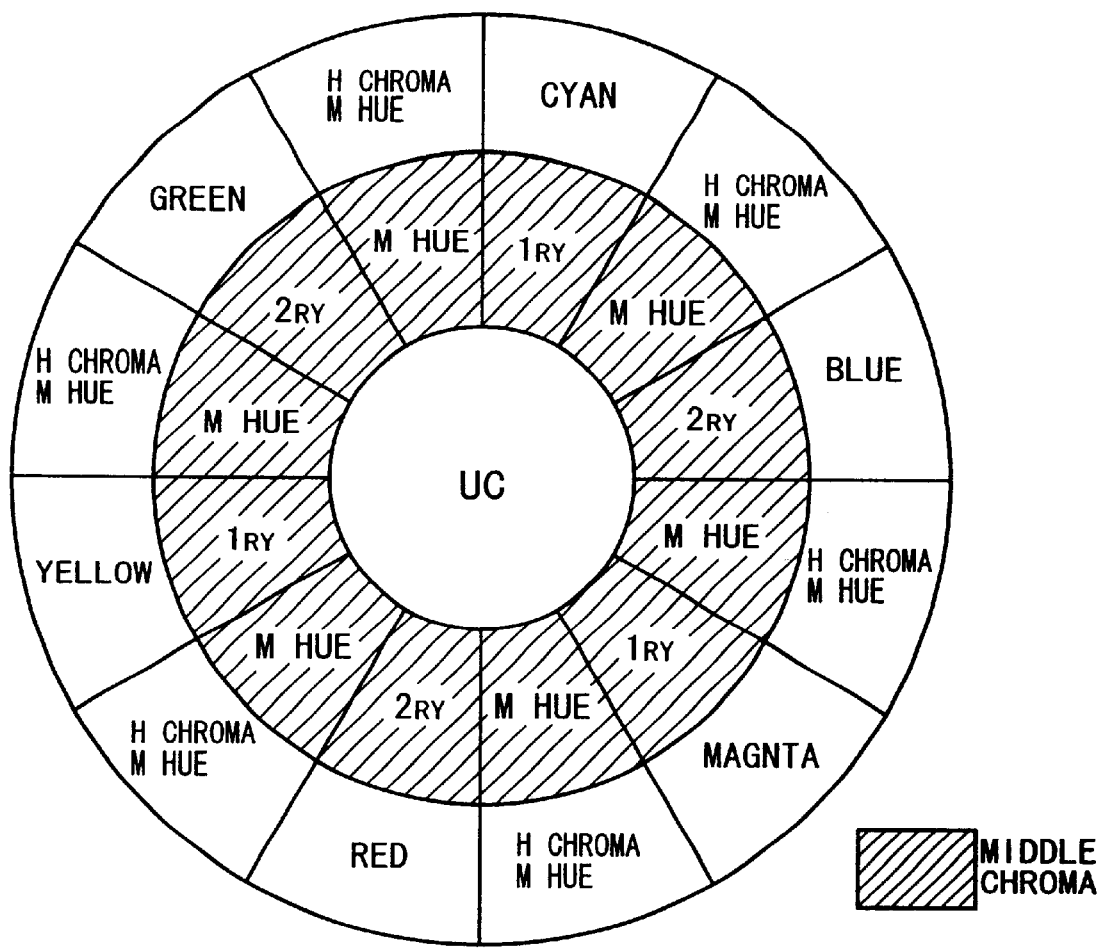
FIG. 17 shows an example of the sections of the color areas according to the second embodiment of the present invention.

The sections of the color areas are shown in FIG. 17.

An example of color area selection method will be described.

The hue direction selection will first be dealt with. Here, the hue direction represents the position on the outermost circumference in FIG. 17, that is, the primary color, the secondary color or the intermediate.

Figure 18A:
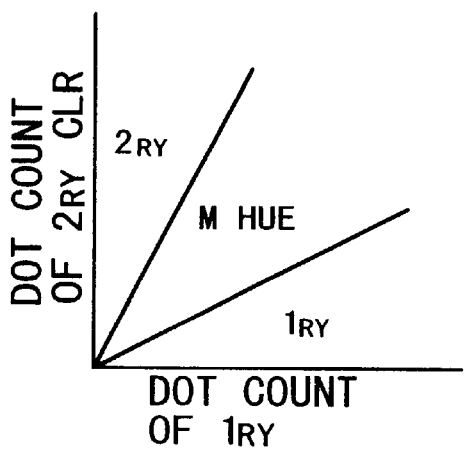
FIGS. 18A and B illustrate an example of a dividing method in a color area according to the second embodiment of the present invention.

In FIG. 18A, the abscissas are dot counts of the primary color, and the ordinates are dot counts of the secondary color. The classification for the primary color, the secondary color and the indicated color is as follows. The comparison is made between the dot count of the primary color divided by 2 and the dot count of the secondary color. If the former is larger, the hue thereof is classified into the primary color.

The comparison is made between the dot count of the primary color and the dot count of the secondary color divided by 2. If the latter is larger, the hue thereof is classified into the secondary color. Otherwise, it is classified into the intermediate hue.

Then, the chromaticity direction, that is, whether it is close to the center, close to the circumference or in the middle, is discriminated.

Figure 18B:
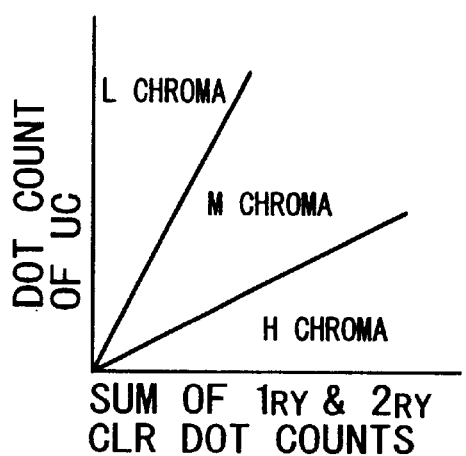

FIG. 18B shows a sum of dot counts of the primary color and secondary color vs. dot count of the UC (ordinates). The classification in the chromaticity direction is as follows. The comparison is made between the sum of the dot counts of the primary color and the secondary color divided by 2 and the dot count of the UC, and if the former is larger, the chromaticity is closest to the circumference, and the area is determined as the color area of the dot count area.

The comparison is made between the sum of the dot counts of the primary color and the secondary color divided by 2 and the dot count of UC. If the latter is larger, the comparison is made between the dot count of UC divided by 2 and the sun of the dot counts of the primary color and the secondary color, and if the former is larger, the chromaticity is closest to the center, and the area is determined as the color area of the dot count area. Otherwise, the intermediate area is selected.

The foregoing determination method of the hue and the chromaticity are summarized as follows. (hue direction)

If $D1/2 > D2$, the primary color area is selected.

If $D2/2 > D1$, the secondary color area is selected.

Otherwise, the intermediate hue area is selected.

(Chromaticity Direction)

If $(D1+D2)/2 > UC$, the high chromaticity area (circumference side) is selected.

If $UC > (D1+D2)/2$, the low chromaticity area (center side) is selected.

Otherwise, the intermediate chromaticity area is selected.

In this manner, the color area is finely divided, the differences in the degree of the boundary stripe can be finely dealt with, and the behavior of each of the ink can be taken into account.

(Thinning Rank Graph)

FIGS. 19A–F show an example of a combination of the rank graphs used in this embodiment.

In this embodiment, the thinning ranks can be designated for 7 areas (cyan, magenta, yellow, blue, green, red and UC) of the color areas shown in FIG. 17, for the respective inks. The thinning rank graph for the intermediate areas other than those, are calculated from the graphs in the 7 areas. By doing so, the number of data of the rank graphs can be reduced.

In an example of calculating the graph, an average between the primary color and the secondary color is taken for the intermediate area in the hue direction, and a higher one of the thinning ranks of the high chromaticity and the low chromaticity, for the intermediate area in the chromaticity direction.

The number of thinning rank graph prepared in this embodiment is 7 (color areas)×3 (the number of links)×2 (the number of divisions of the thinning area)=42, in consideration of the designation of the thinning ranks and division of the thinning area into two divisions.

Among them, the thinning rank graphs for the blue color area are actually used when the result of the color area discrimination designates the dot count area of blue color. This is taken out, and is shown in FIGS. 19A–F. Similarly, the rank graph heads for the red color area is shown in FIGS. 20A–F.

By the thinning rank graphs and the total dot count, the thinning rank to be used in the SMS thinning process is determined.

Thus, the thinning rank graphs are not designated for all the divided color areas, but the basic ones are designated, and the graph is calculated out for the intermediated areas, so that amount of the data can be reduced.

After the rank determination, the SMS thinning process is carried out for the unit areas, similarly to the first embodiment. These processes are carried out for one band, and then, the printing for one scan is carried out.

Figure 19A:
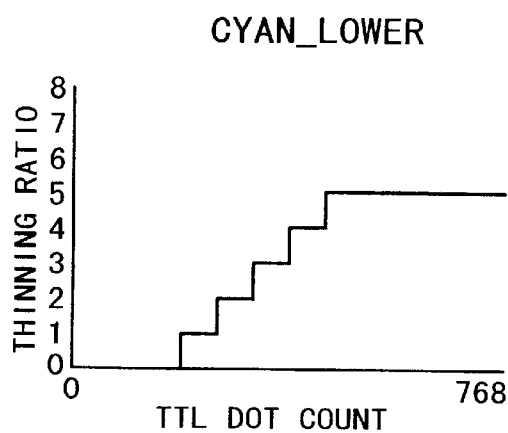
FIGS. 19A to F show an example of a thinning rank graph according to the second embodiment of the present invention.
Figure 19B:
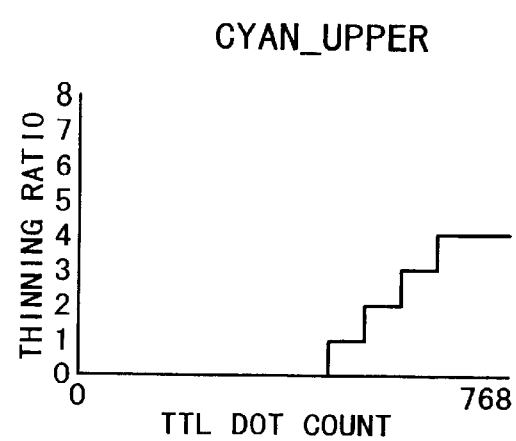
Figure 19C:
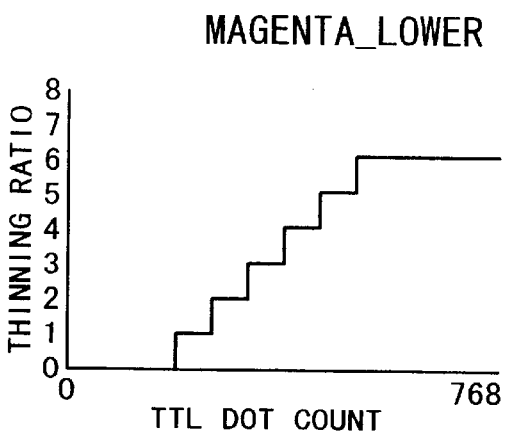
Figure 19D:
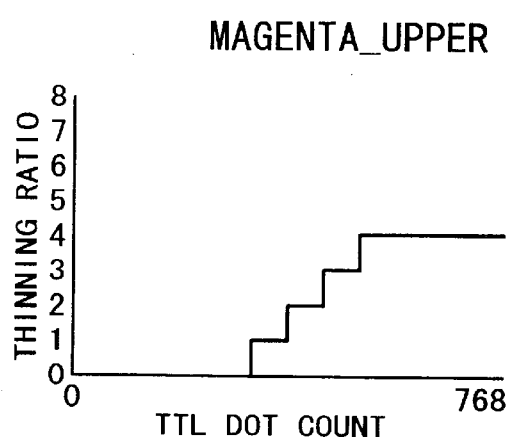
Figure 19E:
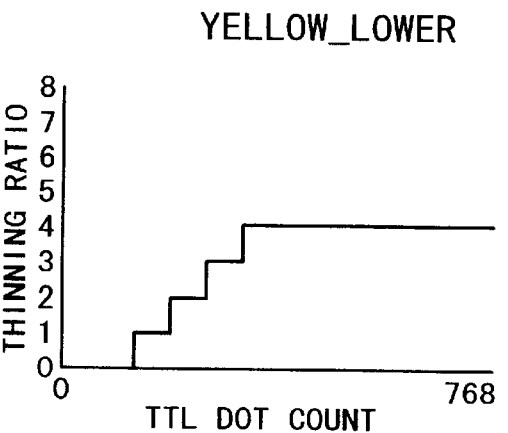
Figure 19F:
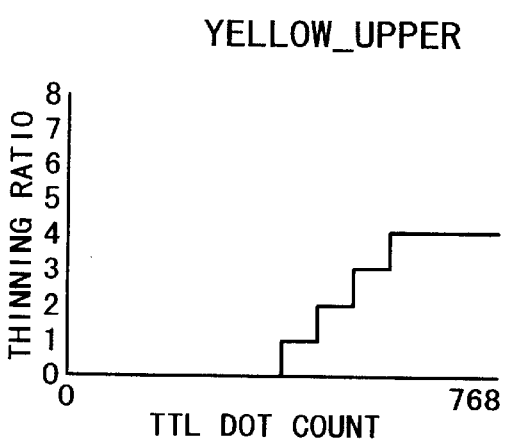
Figure 20A:
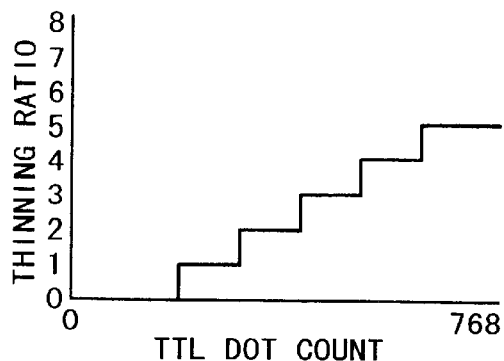
FIGS. 20A to F show an example of a thinning rank graph according to the second embodiment of the present invention.
Figure 20B:
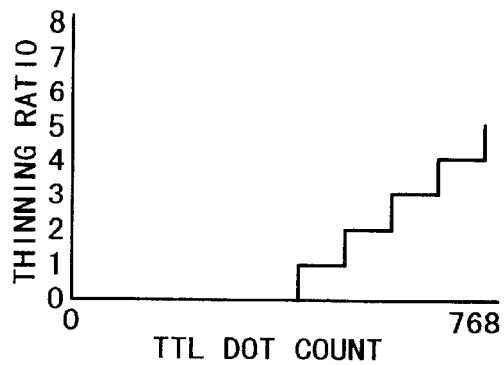
Figure 20C:
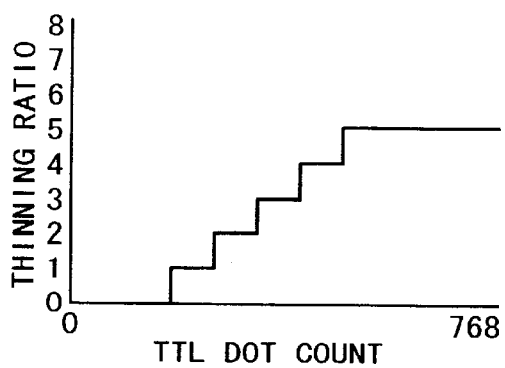
Figure 20D:
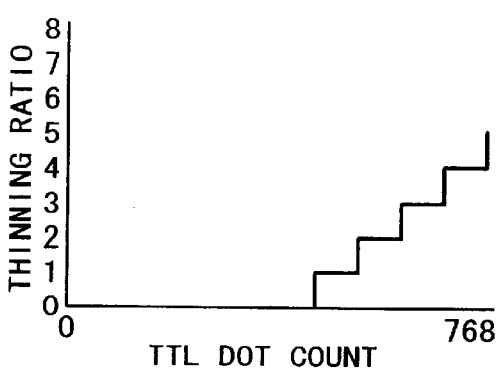
Figure 20E:
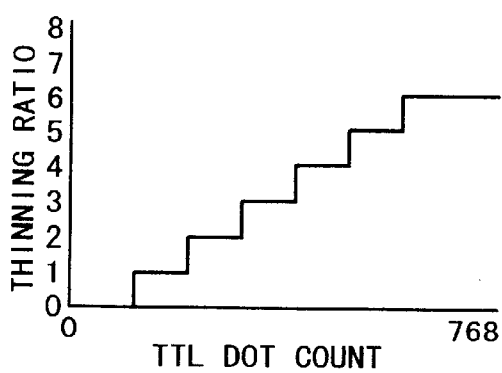
Figure 20F:
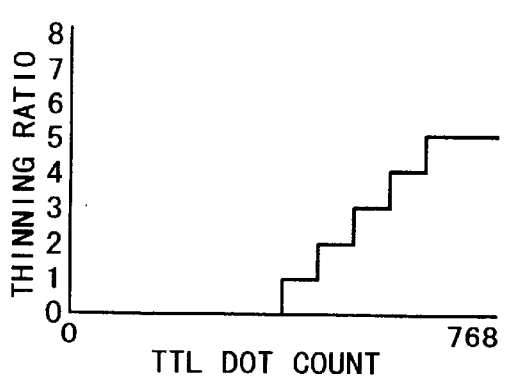
Figure 21:
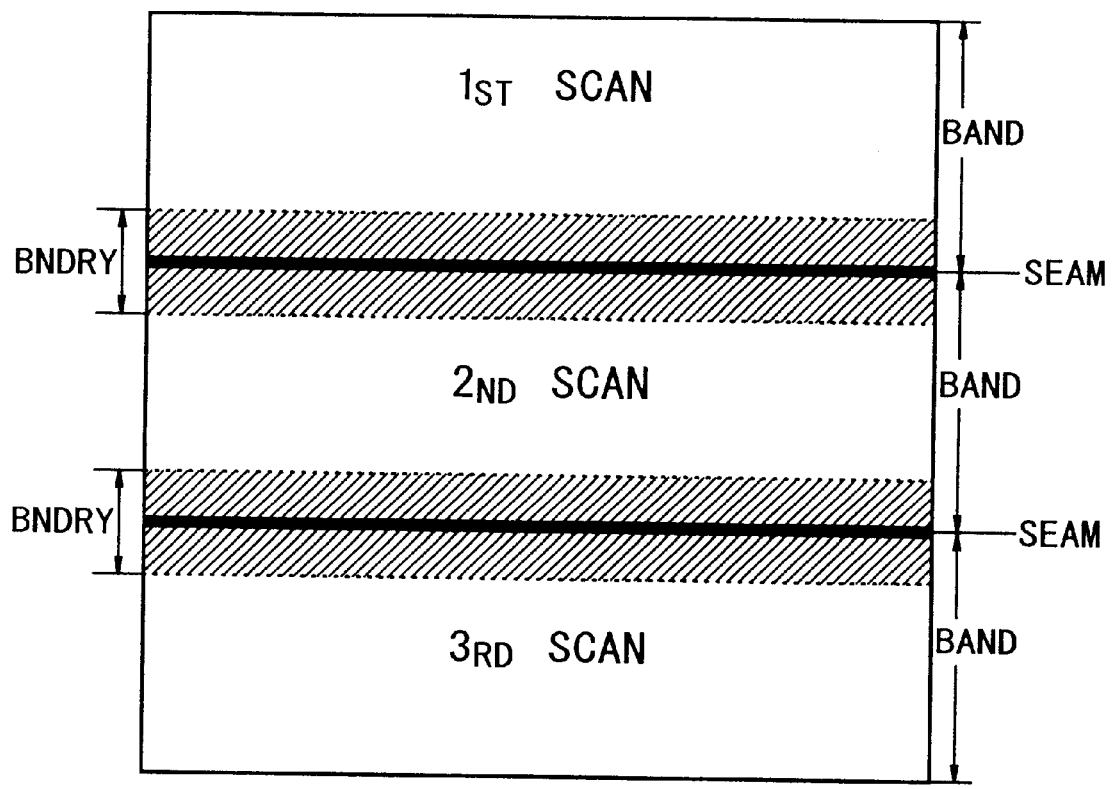
FIG. 21 is a schematic view illustrating a band and boundary.

Referring to FIGS. 19A, C, the description will be made as to the thinning process in the gradation from the white to the UC (under color, a color mixture of YMC) through the blue (the same as with the foregoing example).

Where the color is toward the blue, the printing is carried out using the cyan ink and the magenta ink, and at the point where the blue is maximum, the cyan and magenta data are indicative of solid print (maximum duty data), that is, level 512 in this example. In the state, the color area of the unit area is blue, and in order to suppress the production of the boundary stripe, rank 5 thinning (FIG. 19A) which is high is effected to the cyan lower, and rank 6 (FIG. 19C) which is also high is effected to the magenta lower.

FIG. 20 illustrates the process of the printing of a gradation from white, red to UC. The cyan ink is first started to be used at the point of change from the red at the maximum to the UC. At this point, the data of the magenta and yellow are of maximum duty, that is 512, which is equal to the data where the color changes from blue to black in the case of the gradation white-blue-black, and the color area is red. Referring to FIG. 20, rank 3 thinning is effected for the cyan lower (FIG. 20A), and rank 5 thinning is effected for magenta lower (FIG. 20C). At this time, the cyan dot density is not large (sparse) at the beginning of the data, and therefore, the relatively low rate (rank 3) thinning is executed for the cyan color. Thus, the cyan dot void is not conspicuous. If, on the contrary, the thinning table of FIG. 19 is used without consideration to the color area, the high rate thinning, namely, rank 5 thinning, is effected to the cyan lower, and therefore, the cyan dot void is conspicuous.

In the first and second embodiments, the used dot count unit area is 16 dots×16 raster lines (sub-scan direction). However, this size is not limiting, and the size of the unit area is properly determined by one skilled in the art in consideration of the conspicuousness of the boundary stripe, the load added by the data process, the output resolution or the like.

The area in which the dot counting is executed is astride the boundary area between the adjacent bands, as shown in FIG. 5, for example, in the first and second embodiments, but the present invention is not limited to this example. For example, the dot counting may be carried out only for the bottom portion of the prior scanning, or it may be carried out for the top portion of the next scanning.

The position where the SMS thinning process is carried out, is not limited to the bottom end portion of the prior scan, but it may be the top end of the later scan, or both, that is, astride the boundary between adjacent bands.

It is desirable that most appropriate dot count area and SMS thinning process area can be selected on the basis of combination of the recording material and the recording ink. For this reason, the dot count area and/or the SMS is changeable responding to the recording material used.

The number of color areas with the above is two in this embodiment, but the number is not limiting.

In this embodiment, the one path printing is the basic mode, since in that mode, the boundary stripe production is most conspicuous. However, the boundary stripe is more or less produced in the multi-path printing. The thinning process is preferable in the multi-path printing with the thinning rank graph corresponding to the number of paths for the multi-path mode.

The boundary stripe is caused mainly by the bleeding of the recording ink on the recording material, and therefore, the boundary stripe is more conspicuous under high temperature and high humidity ambient conditions since then the degree of the recording ink bleeding is higher. In view of this, it is preferable that a plurality of threshold levels for switching the thinning rank graph and the thinning area are provided, which are selectable depending on the ambient conditions.

In the foregoing embodiment, the recording inks used are cyan, magenta, yellow and black inks. However, the present invention is applicable to the system using so-called photoink, which is diluted regular ink.

In the foregoing description, the data relating to the amount of ejection for each of the inks is binary data, but the present invention is not limited to this. The data may be R, B, G multi-level data, if the data corresponds to the amount of the ink ejected. In this case, the amount of the ink is not limited to the reduction by thinning the data, but may be multiplication of reduction coefficients to the multi-level data. The ejection amount of the ink may be reduced using a look-up table at the time of color conversion from R, G, B to Y, M, C, K, and this example will be described as a third embodiment.

(Third Embodiment)

In the third embodiment, the use is made with a recording system in which a plurality of recording heads print with recording ink on a recording material to form an image, similarly to the first embodiment. The description will be made as to an example of a boundary process in the case of multi-level data of R, G, B as the data relating to the ejection amounts of the inks.

Figure 24:
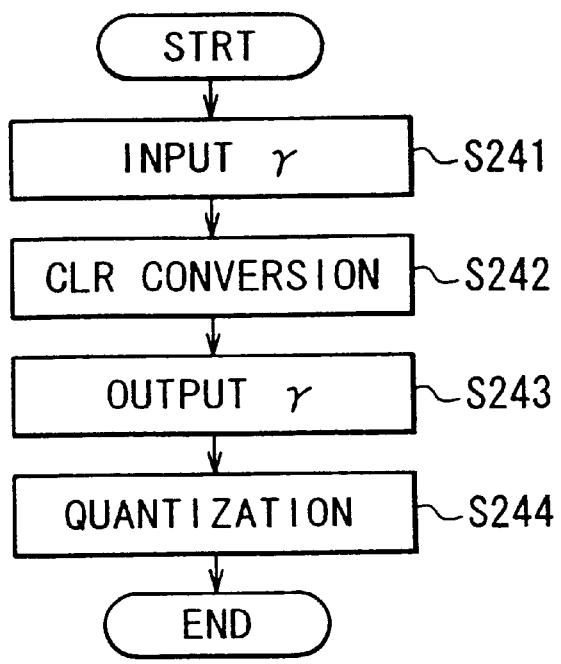
FIG. 24 is a flow chart of an example of the color processing method according to a third embodiment of the present invention.

FIG. 24 is a flowchart of an example of the color processing method. The color processing is a process of producing printable data for a printer from the data received from personal computer or the like, and in this embodiment, the RGB 256 tone gradation (8 bit) data (input data for a four color (CMYK) printer) to CMYK binary output data.

At first, an input γ correction process is carried out at step S241. The curve is also called a "video curve", and the correction is carried out in view of a correction curve as in the case of presentation on a display, for example. The input and output are made on the basis of RGB 256 tone gradation data. The color conversion executed in the step S242 is dependent on whether the output image is a graphic image or photographic image, and it is also called a preliminary step. In this step, the input and output data are RGB 256 tone gradation data. In an UCLBGR (background color removal and black generation) process and an output γ correction process at step S243, the RGB 256 tone gradation data are converted to CMYK 256 tone gradation data. In the conversion, a look-up table is used which determines the output from the input in 1 to 1 correspondence.

In order to make the CMYK256 tone gradation data printable, the data are converted or quantized to CMYK binary (3 or 4 level) data. This is the end of the color processing.

Figure 25:
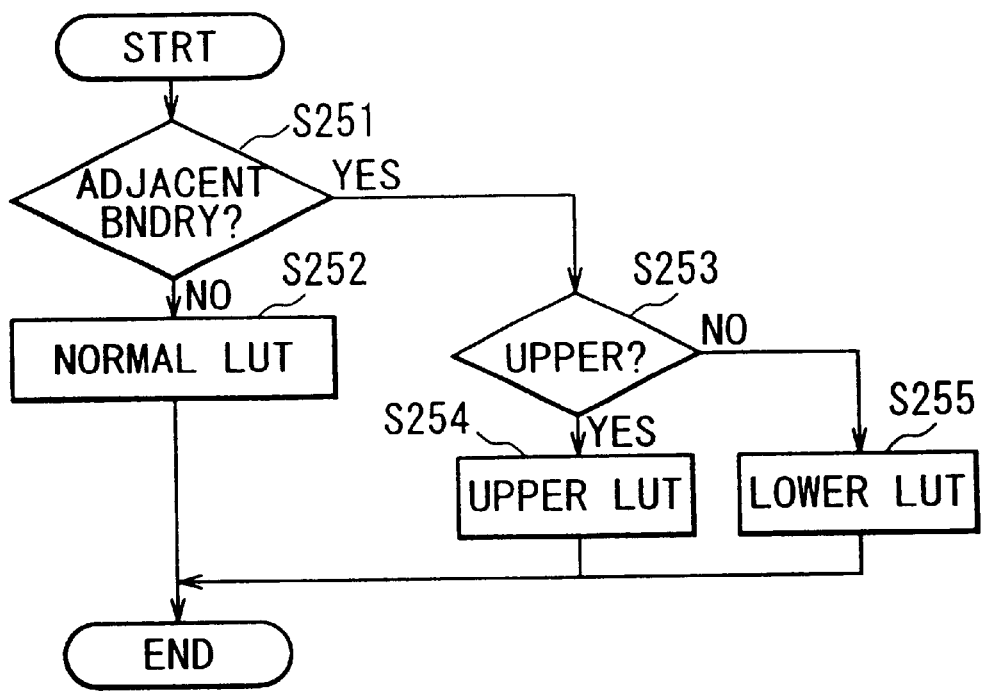
FIG. 25 is a flow chart of process steps according to a first embodiment of the present invention.

The boundary process in the multi-level data which is one of the features of this embodiment is carried out simultaneously with the process in the step S243 of FIG. 24. FIG. 25 is a flowchart of the boundary process in the multi-level data.

For this process, when the RGB 256 tone gradation data are converted to the CMYK256 tone gradation data, the discrimination is made as to whether or not it is adjacent the boundary area (whether or not it is in the four raster lines at the sheet discharge side in the boundary in this embodiment) (step S251). If not, the conversion is normal, that is, the conversion is carried out using the normal look-up table. If it is adjacent the boundary area, a further discrimination is made as to whether it is UPPER or LOWER (FIG. 5) (step S253), and the conversion to the CMYK256 tone gradation data is carried out using a look-up table in accordance with the result of the further discrimination (steps S254 and 255).

Figure 26:
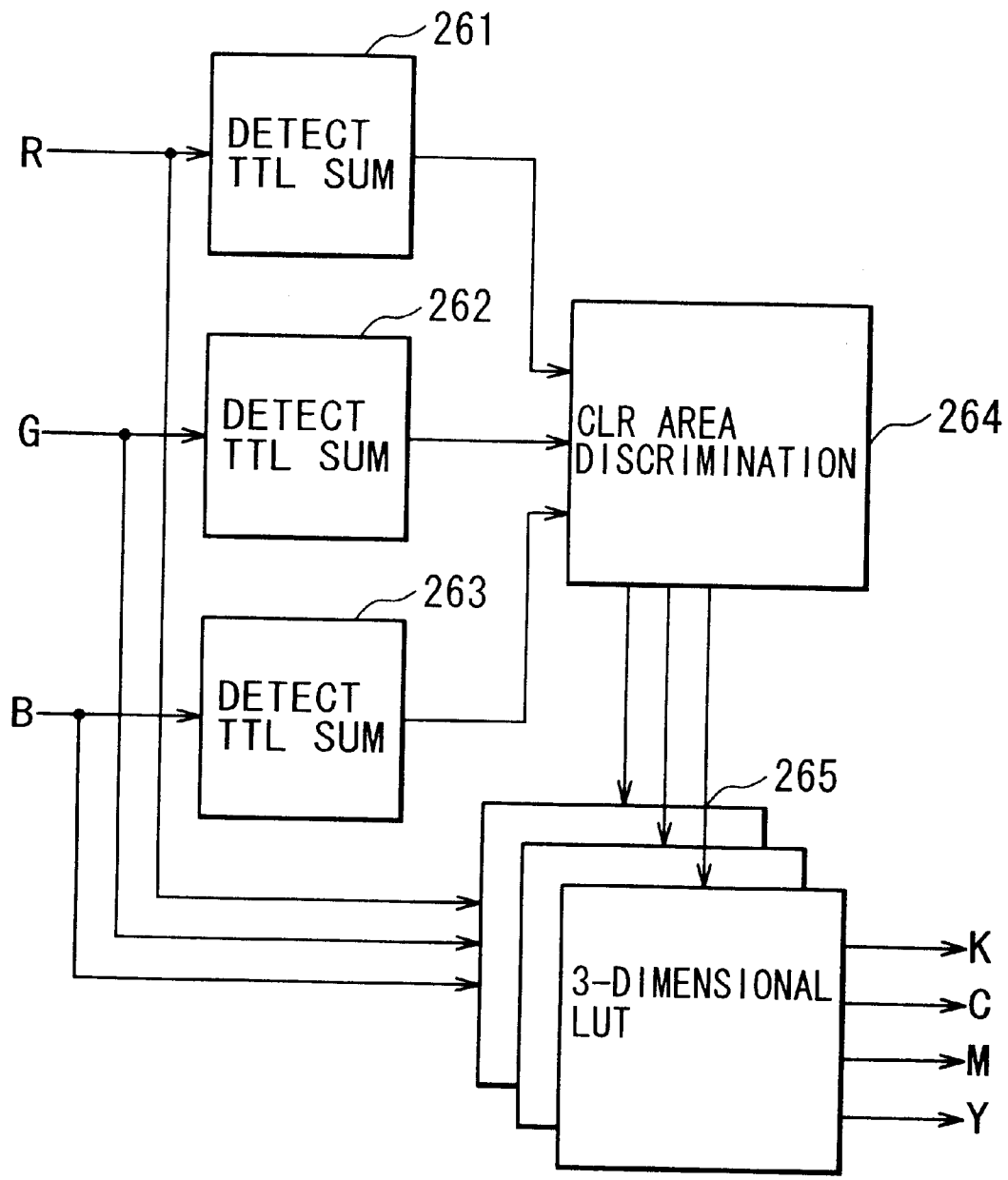
FIG. 26 is a block diagram of a boundary process according to the third embodiment of the present invention.

Referring to FIG. 26, description will be made as to the boundary process in steps S254 and S255. A total sum detecting circuit 261–263 determines total sums of data amounts of respective colors in a predetermined area adjacent the boundary (dot count area or 16×16 dot area in Embodiment 1), and on the basis of the total sums, the color area of the predetermined area is discriminated by a color area discrimination circuit 264 (FIG. 17). More particularly, several or several tens of three dimensional look-up tables 265 are prepared, and one of the look-up tables 265 is selected in accordance with the color area discriminated by the color area discrimination circuit 264, so that ejection amounts in the boundary area can be reduced in accordance with the color area together with the data conversion from the RGB to the CMYK data. By doing so, the data conversion is executed not only on the basis of the information from each of the pixels, but also on the basis of the data amounts of the dot count area in a certain area, and therefore, a more effective and proper boundary process is accomplished. It is more preferable to select the three-dimensional LUT 265 not only on the basis of the color area, but also on the basis of the total sums of the respective colors provided by the total sum detecting circuit 261–263. The color area is relative information covering the colors, and therefore, use of the total sums of the amounts of the data of the respective colors, which are absolute information, is desirable to obtain the degree of generation of the bleeding and the stripe at the boundary.

When the multi-level data are converted using the look-up table, the boundary processing is carried out. This is preferable since then a better value can be selected for each of all of the input data, and therefore, the effect of the boundary processing is enhanced. Additionally, the processing is carried out before the quantization, and therefore, unlike the processing skipping the dots as with the processing after the binarization. Therefore, the RGB multi-level data is converted during the multi-level data generation step, and no dot is skipped, thus accomplishing natural prints.

In addition, since the boundary processing is carried out at the time of the color conversion from the RGB to the YMCK data, and the conversion table can be saved, the processing is efficient. The boundary processing may be carried out not at the time of the color conversion, but after the color conversion, that is, after the conversion to the YMCK multi-level data.

In this manner, according to the processing method of this embodiment, the boundary processing can be effected to the multi-level data. In the embodiment, the multi-level data have been described as being 256 tone gradation, but the number of tone gradation levels is not limited to this example.

In the foregoing example, the boundary processing in the ink jet recording apparatus has been taken, but the processing may be carried out by the host computer (PC), that is, by the printer driver side. In such a case, the data having been subjected to the boundary processing is supplied to the ink jet recording apparatus from the host computer.

(Others)

The present invention is very effective when used with an ink jet recording system, in particular, when used with an ink jet recording head which comprises a means for generating thermal energy (for example, electrothermal transducer, or a laser) used for ejecting ink, and in which the state of ink is changed by the thermal energy, and also a recording apparatus employing such an ink jet recording head. This is due to the fact that according to such a recording system, recording can be made at high density, and a highly precise image can be formed.

The present invention is particularly suitably usable in an ink jet recording head and recording apparatus wherein thermal energy by an electrothermal transducer, laser beam or the like is used to cause a change of state of the ink to eject or discharge the ink. This is because the high density of the picture elements and the high resolution of the recording are possible.

The typical structure and the operational principle are preferably the ones disclosed in U.S. Pat. Nos. 4,723,129 and 4,740,796. The principle and structure are applicable to a so-called on-demand type recording system and a continuous type recording system. Particularly, however, it is suitable for the on-demand type because the principle is such that at least one driving signal is applied to an electrothermal transducer disposed on a liquid (ink) retaining sheet or liquid passage, the driving signal being enough to provide such a quick temperature rise beyond a departure from nucleation boiling point, by which the thermal energy is provided by the electrothermal transducer to produce film boiling on the heating portion of the recording head, whereby a bubble can be formed in the liquid (ink) corresponding to each of the driving signals. By the production, development and contraction of the the bubble, the liquid (ink) is ejected through an ejection outlet to produce at least one droplet. The driving signal is preferably in the form of a pulse, because the development and contraction of the bubble can be effected instantaneously, and therefore, the liquid (ink) is ejected with quick response. The driving signal in the form of the pulse is preferably such as disclosed in U.S. Pat. Nos. 4,463,359 and 4,345,262. In addition, the temperature increasing rate of the heating surface is preferably such as disclosed in U.S. Pat. No. 4,313,124.

The structure of the recording head may be as shown in U.S. Pat. Nos. 4,558,333 and 4,459,600 wherein the heating portion is disposed at a bent portion, as well as the structure of the combination of the ejection outlet, liquid passage and the electrothermal transducer as disclosed in the above-mentioned patents. In addition, the present invention is applicable to the structure disclosed in Japanese Laid-Open Patent Application No. 123670/1984 wherein a common slit is used as the ejection outlet for plural electrothermal transducers, and to the structure disclosed in Japanese Laid-Open Patent Application No. 138461/1984 wherein an opening for absorbing pressure wave of the thermal energy is formed corresponding to the ejecting portion. This is because the present invention is effective to perform the recording operation with certainty and at high efficiency irrespective of the type of the recording head.

In addition, the present invention is applicable to a serial type recording head wherein the recording head is fixed on the main assembly, to a replaceable chip type recording head which is connected electrically with the main apparatus and can be supplied with the ink when it is mounted in the main assembly, or to a cartridge type recording head having an integral ink container.

The provisions of the recovery means and/or the auxiliary means for the preliminary operation are preferable, because they can further stabilize the effects of the present invention. As for such means, there are capping means for the recording head, cleaning means therefor, pressurizing or suction means, and preliminary heating means, which may be the electrothermal transducer, an additional heating element or a combination thereof. Also, means for effecting preliminary ejection (not for the recording operation) can stabilize the recording operation.

As regards the variation of the recording head mountable, it may be a single corresponding to a single color ink, or may be plural corresponding to the plurality of ink materials having different recording color or density. The present invention is effectively applicable to an apparatus having at least one of a monochromatic mode mainly with black, a multi-color mode with different color ink materials and/or a full-color mode using the mixture of the colors, which may be an integrally formed recording unit or a combination of plural recording heads.

Furthermore, in the foregoing embodiment, the ink has been liquid. It may be, however, an ink material which is solidified below room temperature, but liquefied at room temperature. Since the ink is controlled within the temperature not lower than 30° C. and not higher than 70° C. to stabilize the viscosity of the ink to provide the stabilized ejection in a usual recording apparatus of this type, the ink may be such that it is liquid within the temperature range when the recording signal is applied. The present invention is applicable to other types of ink. In one of them, the temperature rise due to the thermal energy is positively prevented by consuming it for the state change of the ink from the solid state to the liquid state. Another ink material is solidified when it is unused, to prevent the evaporation of the ink. In either of these cases, upon the application of the recording signal producing thermal energy, the ink is liquefied, and the liquefied ink may be ejected. Another ink material may start to be solidified at the time it reaches the recording material. The present invention is also applicable to such an ink material as is liquefied by the application of the thermal energy. Such an ink material may be retained as a liquid or solid material in through-holes or recesses formed in a porous sheet as disclosed in Japanese Laid-Open Patent Application No. 56847/1979 and Japanese Laid-Open Patent Application No. 71260/1985. The sheet is faced to the electrothermal transducers. The most effective system for the ink materials described above is the film boiling system.

The ink jet recording apparatus may be used as an output terminal of an information processing apparatus such as computer or the like, as a copying apparatus combined with an image reader or the like, or as a facsimile machine having information sending and receiving functions.

As described in the foregoing, according to the embodiments of the present invention, the unit area in which the ink ejection amount is counted is astride the boundary between the adjacent bands, and the situation at the boundary can be properly predicted.

By using different sizes for the dot count area and the thinning area, appropriate thinning is possible.

Thus, the thinning area can be properly selected, and therefore, the production of the banding can be effectively suppressed.

While the invention has been described with reference to the structures disclosed herein, it is not confined to the details set forth and this application is intended to cover such modifications or changes as may come within the purpose of the improvements or the scope of the following claims.

What is claimed is:

1. An ink jet recording apparatus for effecting recording on a recording material by ejecting a plurality of inks with relative scanning movement between a recording head and the recording material, said ink jet recording apparatus comprising:

obtaining means for obtaining relative information indicative of a relative relation between the amounts of inks to be ejected for each of plural unit areas provided by dividing an area in the neighborhood of a boundary between adjacent bands of scanning recording of the recording head on the recording material;

determining means for determining, for each of the inks, a reduction rate at which the amount of the ink to be ejected to the neighborhood of the boundary in a unit area on the basis of the relative information for each of the plural unit areas obtained by said obtaining means and on the basis of quantity information indicative of an amount of each ink to be ejected in the unit area; and reducing means for reducing the amount of each ink to be ejected to the neighborhood of the boundary on the basis of the reduction rate for each ink determined by said determining means.

2. An ink jet recording apparatus according to claim 1, wherein said obtaining means obtains the amount of each of the inks by counting the number of binary data, said determining means determines a thinning rate of the binary data as the reduction rate, and said reducing means thins the binary data on the basis of the thinning rate.

3. An ink jet recording method of effecting recording on a recording material by ejecting a plurality of inks with relative scanning movement between a recording head and the recording material, said ink jet recording method comprising:

a step of obtaining relative information indicative of a relative relation between amounts of the inks to be ejected for each of plural unit areas provided by dividing an area in the neighborhood of a boundary between adjacent bands of scanning recording of the recording head on the recording material;

a step of determining, for each of the inks, a reduction rate at which the amount of the ink to be ejected to the neighborhood of the boundary in a unit area on the basis of the relative information for each of the plural unit areas obtained in said obtaining step and on the basis of quantity information indicative of an amount of each ink to be ejected in the unit area; and a step of reducing the amount of each ink to be ejected to the neighborhood of the boundary on the basis of the reduction rate for each ink determined in said determining step.

4. A data processing method for effecting recording on a recording material by ejecting a plurality of inks with relative scanning movement between a recording head and the recording material, said data processing method comprising:

a step of obtaining relative information indicative of a relative relation between amounts of the inks to be ejected for each of plural unit areas provided by dividing an area in the neighborhood of a boundary between adjacent bands of scanning recording of the recording head on the recording material;

a step of determining, for each of the inks, a reduction rate at which the amount of the ink to be ejected to the neighborhood of the boundary in a unit area on the basis of the relative information for each of the unit areas obtained in said obtaining step and on the basis of quantity information indicative of an amount of each ink to be ejected in the unit area; and a step of reducing the amount of each ink to be ejected to the neighborhood of the boundary on the basis of the reduction rate for each ink determined in said determining step.

5. An ink jet recording apparatus for effecting recording on a recording material by ejecting a plurality of inks with relative scanning movement between a recording head and the recording material, said ink jet recording apparatus comprising:

obtaining means for obtaining relative information indicative of a relative relation between the number of data corresponding to the inks to be ejected for each of plural unit areas provided by dividing an area in the neighborhood of a boundary between adjacent bands of scanning recording of the recording head on the recording material;

determining means for determining, for each of the inks, a thinning rate for thinning data corresponding to the ink to be ejected to a thinning area in a unit area on the basis of the relative information for each of the plural unit areas obtained by said obtaining means and on the basis of the number of the data corresponding to each ink to be ejected in the unit area; and thinning means for thinning the data corresponding to each ink to be ejected to the neighborhood of the boundary on the basis of the thinning rate for each ink determined by said determining means.

6. An apparatus according to claim 5, wherein said determining means includes discrimination means for discriminating a hue and a chromaticity of each of the plural unit areas from the relative information thereof obtained by said obtaining means, and determines the thinning rate on the basis of the hue and the chromaticity discriminated by said discrimination means and on the basis of the number of data corresponding to each ink to be ejected to the unit area.

7. An apparatus according to claim 6, wherein said determining means determines the thinning rate on the basis of the hue and the chromaticity discriminated by said discrimination means and a sum of the number of the data corresponding to each ink to be ejected to the unit area.

8. An apparatus according to claim 5, wherein the recording head comprises plural recording heads each provided for respective colors and arranged along a scanning direction.

9. An apparatus according to any one of claims 5–8, wherein the numbers of data obtained by said obtaining means can be weighted for the respective inks.

10. An apparatus according to any one of claims 5–8, wherein said determining means determines the thinning rates for respective divided areas into which thinning areas are divided.

11. An apparatus according to claim 10, wherein the divided areas of the determining means are provided in a direction different from the scanning direction.

12. An apparatus according to any one claims 5–8, wherein said determining means is capable of determining the thinning rates for respective combinations of the hue and the chromaticity discriminated by said discrimination means.

13. An apparatus according to any one of claims 5–8, wherein said determining means is capable of determining the thinning rates independently for the respective inks.

14. An apparatus according to claim 5, wherein said determining means determines the thinning rates as thinning ranks which are discrete with a predetermined discrete value.

15. An apparatus according to claim 5, wherein said thinning means operates on the basis of the thinning rate set for each of the thinning areas.

16. An apparatus according to claim 5, wherein said thinning means is capable of operating independently for the respective inks.

17. An ink jet recording apparatus for effecting recording on a recording material by ejecting a plurality of inks with relative scanning movement between a recording head and the recording material, said ink jet recording apparatus comprising:

obtaining means for obtaining relative information indicative of a relative relation between the amounts of inks to be ejected for each of plural unit areas provided by dividing an area in the neighborhood of a boundary between adjacent bands of scanning recording of the recording head on the recording material; and reducing means for reducing an amount of each of the inks to be ejected to a neighborhood of a boundary in a unit area on the basis of the relative information for each of the plural unit areas obtained by said obtaining means.

18. An apparatus according to claim 17, wherein said reducing means includes determining means for determining, for each of the inks, a reduction rate at which the amount of the ink to be ejected to the neighborhood of the boundary in the unit area on the basis of the relative information for each of the plural unit areas obtained by said obtaining means and on the basis of quantity information indicative of an amount of each ink to be ejected in the unit area, and said reducing means reduces the amounts of the inks to be ejected to the neighborhood of the boundary on the basis of the reduction rate determined for each ink by said determining means.

19. An apparatus according to claim 18, wherein said obtaining means obtains the amount of each ink to be ejected to the unit area by counting binary data, said determining means determines a binary data thinning rate as the reduction rate, and said reducing means thins the binary data on the basis of the thinning rate.

20. An apparatus according to claim 17, wherein said obtaining means obtains the relative information by adding multi-level data corresponding to each color, and said reducing means lowers data levels of the multi-level data on the basis of the relative information.

21. An apparatus according to claim 17, wherein said obtaining means obtains the amounts of each ink to be ejected to the unit area by adding the multi-level data corresponding to R, G, and B colors, and said reducing means includes a plurality of tables for converting the multi-level data corresponding to the R, G, and B colors to multi-level data which correspond at least to Y, M, and C colors and which are reduced in levels at different reduction rates, and the tables are selected on the basis of the relative information.

22. An ink jet recording method of effecting recording on a recording material by ejecting a plurality of inks with relative scanning movement between a recording head and the recording material, said ink jet recording method, comprising:

a step of obtaining relative information indicative of a relative relation between the amounts of inks to be ejected for each of plural areas provided by dividing an area in the neighborhood of a boundary between adjacent bands of scanning recording of the recording head on the recording material; and a step of reducing an amount of each of the inks to be ejected to a neighborhood of a boundary in a unit area on the basis of the relative information for each of the plural unit areas obtained in said obtaining step.

23. A data processing method for effecting recording on a recording material by ejecting a plurality of inks with relative scanning movement between a recording head and the recording material, said data processing method, comprising:

a step of obtaining relative information indicative of a relative relation between the amounts of inks to be ejected for each of plural unit areas provided by dividing an area in the neighborhood of a boundary between adjacent bands of scanning recording of the recording head on the recording material; and a step of reducing an amount of each of the inks to be ejected to a neighborhood of a boundary in a unit area on the basis of the relative information for each of the unit areas obtained in said obtaining step.

* * * * *

UNITED STATES PATENT AND TRADEMARK OFFICE
CERTIFICATE OF CORRECTION

PATENT NO. : 6,629,743 B2  
DATED : October 7, 2003  
INVENTOR(S) : Chikuma et al.

It is certified that error appears in the above-identified patent and that said Letters Patent is hereby corrected as shown below:

Title page,  
Item [57], ABSTRACT,  
Line 15, "into" should read -- ink to --.

Column 5,  
Line 39, "contain," should read -- containing the data, --; and  
Line 43, "long" should read -- long a --.

Column 6,  
Line 45, "bite ((8" should read -- byte (8 --.

Column 7,  
Line 60, "Details" should read -- details --.

Column 10,  
Line 35, "is" should read -- are --.

Signed and Sealed this

Twenty-second Day of June, 2004

JON W. DUDAS  
*Acting Director of the United States Patent and Trademark Office*